(12) United States Patent
Smith et al.

(10) Patent No.: US 12,010,144 B2
(45) Date of Patent: Jun. 11, 2024

(54) END-TO-END DEVICE ATTESTATION

(71) Applicant: Intel Corporation, Santa Clara, CA (US)

(72) Inventors: Ned M. Smith, Beaverton, OR (US); Jose Benchimol, Haifa (IL); Andrew Draper, Chesham (GB)

(73) Assignee: Intel Corporation, Santa Clara, CA (US)

( * ) Notice: Subject to any disclaimer, the term of this patent is extended or adjusted under 35 U.S.C. 154(b) by 215 days.

(21) Appl. No.: 17/351,004

(22) Filed: Jun. 17, 2021

(65) Prior Publication Data

US 2021/0314365 A1 Oct. 7, 2021

Related U.S. Application Data

(60) Provisional application No. 63/090,030, filed on Oct. 9, 2020, provisional application No. 63/041,007, filed on Jun. 18, 2020.

(51) Int. Cl.
*H04L 29/06* (2006.01)
*G06F 11/34* (2006.01)
(Continued)

(52) U.S. Cl.
CPC .......... *H04L 63/20* (2013.01); *G06F 11/3409* (2013.01); *G06F 11/3055* (2013.01); *G06F 11/3089* (2013.01); *G06F 21/57* (2013.01)

(58) Field of Classification Search
CPC .. H04L 63/20; G06F 11/3055; G06F 11/3089; G06F 21/57
See application file for complete search history.

(56) References Cited

U.S. PATENT DOCUMENTS

| 2014/0066015 A1* | 3/2014 | Aissi | H04W 4/60 455/411 |
| 2017/0024570 A1* | 1/2017 | Pappachan | G06F 21/602 |
| 2020/0145409 A1* | 5/2020 | Pochuev | H04L 63/0876 |

FOREIGN PATENT DOCUMENTS

WO 2021073376 4/2021

OTHER PUBLICATIONS

"DICE Attestation Architecture", Trusted Computer Group Version 1.00 Revision 0.23, (Mar. 1, 2021), 36 pgs.
(Continued)

*Primary Examiner* — Ellen Tran
(74) *Attorney, Agent, or Firm* — Schwegman Lundberg & Woessner, P.A.

(57) ABSTRACT

Various examples of device and system implementations and methods for performing end-to-end attestation operations for multi-layer hardware devices are disclosed. In an example, attestation operations are performed by a verifier, including: obtaining layered attestation evidence regarding a state of a compute device, with the layered attestation evidence including attesting evidence provided from a second hardware layer of the compute device, such that the attesting evidence provided from the second hardware layer is generated from attesting evidence provided from a first hardware layer of the compute device to the second hardware layer of the compute device; obtaining endorsement information relating to the layered attestation evidence for the state of the compute device; determining an appraisal policy for performing attestation of the compute device from the layered attestation evidence; and applying the appraisal policy and the endorsement information to the layered attestation evidence, to perform attestation of the compute device.

28 Claims, 23 Drawing Sheets

(51) Int. Cl.
*H04L 9/40* (2022.01)
*G06F 11/30* (2006.01)
*G06F 21/57* (2013.01)

(56) References Cited

OTHER PUBLICATIONS

"DICE Layering Arch itecture", Version 1.0 Revision 0.19 Jul. 23, 2020, (Jul. 23, 2020), 30 pgs.
"Symmetric Identity Based Device Attestation", Version 1.0 Revision 0.95, (Jan. 7, 2020), 15 pgs.
Birkholz, H, "Remote Attestation Procedures Architecture", draft-ietf-rats-architecture-12 RATS Working Group, (Apr. 2021), 53 pgs.
Birkholz, H, "Concise Software Identification Tags", draft-ietf-sacm-coswid-18 SACM Working Group Internet-Draft Fraunhofer SITIntended status: Standards Track, (Jul. 12, 2021), 44 pgs.
Watsen, K, "A Voucher Artifact for Bootstrapping Protocols", Internet Engineering Task Force (IETF) Request for Comments: 8366, (May 2018), 14 pgs.

* cited by examiner

END-TO-END DEVICE ATTESTATION

PRIORITY CLAIM

This application claims the benefit of priority to: U.S. Provisional Patent Application No. 63/041,007, filed Jun. 18, 2020; and U.S. Provisional Patent Application No. 63/090,030, filed Oct. 9, 2020; both of which are incorporated by reference herein in their entirety.

TECHNICAL FIELD

Embodiments described herein generally relate to data processing, security and attestation techniques, and computing hardware configurations to implement such techniques.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved.

In a similar manner, Internet of Things (IoT) networks and devices are designed to offer a distributed compute arrangement, from a variety of endpoints. IoT devices are physical or virtualized objects that may communicate on a network, and may include sensors, actuators, and other input/output components, which may be used to collect data or perform actions in a real world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, MEC, and IoT networks, devices, and services have introduced a number of advanced use cases and scenarios occurring at and towards the edge of the network. However, these advanced use cases have also introduced a number of corresponding technical challenges relating to security, processing and network resources, service availability and efficiency, among many other issues, especially as more types of computing systems and configurations are deployed. One such challenge is in relation to security and trust, and the operational states of software programs and data, as represented in memory (e.g., DRAM memory), cache memory (e.g., in a cache), or registers (e.g., CPU, or GPU).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
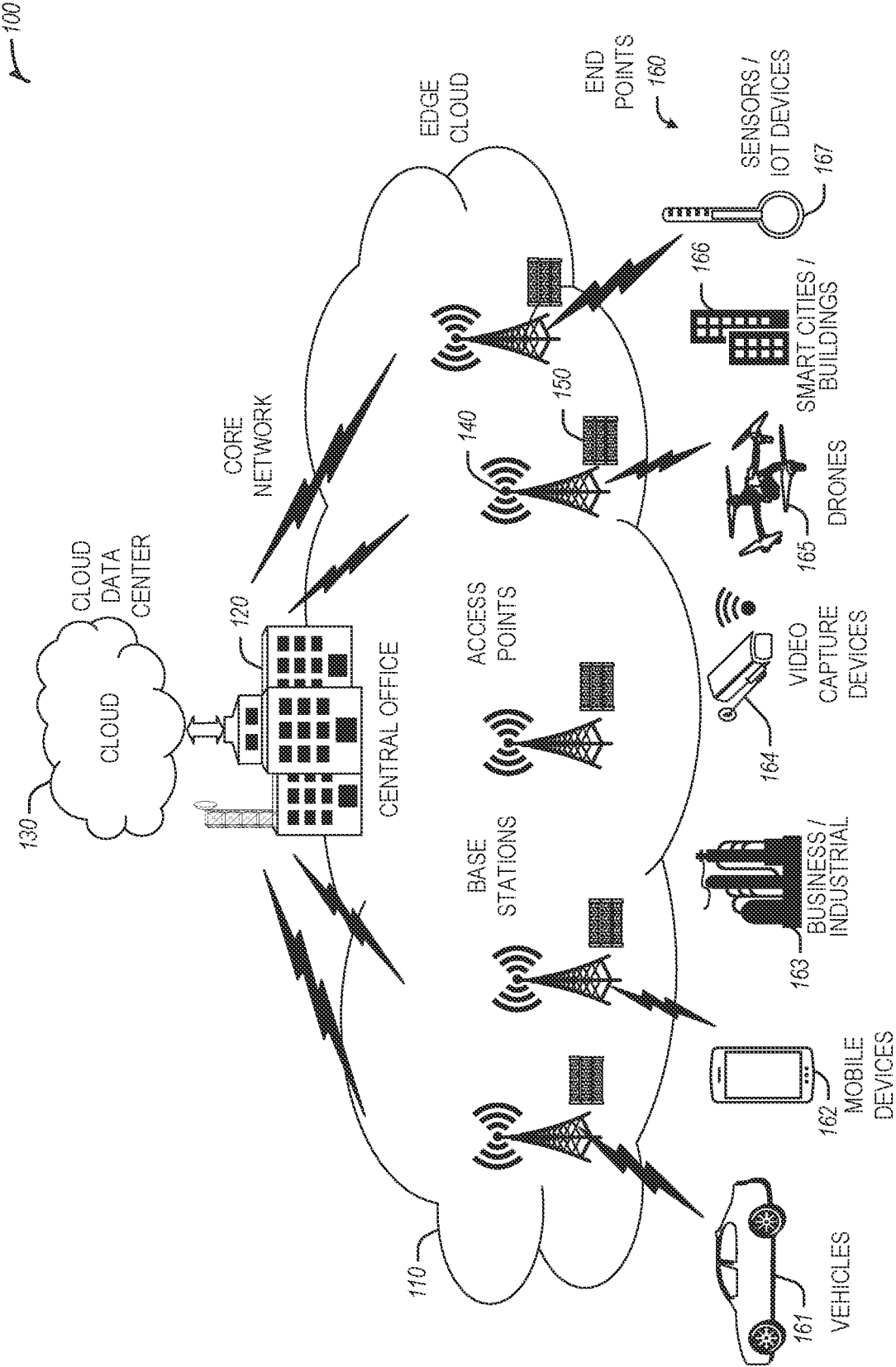
FIG. 1 illustrates an overview of an edge cloud configuration for edge computing, according to an example.

In the following description, methods, configurations, and related apparatuses are disclosed for end-to-end device attestation techniques. The following examples discuss many aspects of end-to-end attestation to identify gaps in understanding, and approaches for addressing shortcomings in current attestation implementations. Further, the following provides an example device template manifest usable for orchestrating reference values in a supply chain.

Workflows for attestation affect the supply chain entities involved in cooperative development of a computing device. Different vendors supply different parts of the device at different times. Reference values, such as those used by an attestation verifier to evaluate trustworthiness of a device, or class of devices, needs to be constructed in a way so that all stakeholders are able to contribute to the device definition for attestation purposes.

The following examples are used to provide a discussion of an End-to-end attestation approach for an exemplary device. This attestation approach demonstrates how manifests containing measurements and/or compositions of measurements meet supply chain requirements for an endorsement lifecycle, and also demonstrates how manifests facilitate design of claims collection algorithms and the verification of evidence. This attestation approach also considers additional aspects of complexity to attestation from device updates; and shows how manifest schemas that describe a composition of modules (e.g. platform, device, component, environment) or a composition of modules and their measurements help manage attestation data and metadata workflows. Additionally, this attestation approach steps through verifier actions for the attestation, showing how manifests facilitate evidence appraisal.

Among other aspects, the following approaches address some of the requirements for device attestation in a manufacturer/supplier setting: (a) An attester should walk a device structure so that a generalized verifier can associate measurements (a.k.a., claims) properly; (b) Multiple suppliers should measure respective parts of the same device without conflict over reference values; (c) Suppliers should have operational autonomy; (d) Suppliers should not become hostage to unscrupulous suppliers; (e) Multiple verifiers should be able to arrive at the same conclusion given the same inputs.

Normally, existing approaches to attestation have focused on software. However, the following identifies ways to measure certain types of hardware, and how an end-to-end attestation model can be defined around this form of attestation. Additionally, existing approaches to attestation have relied on standardized or de facto standardized approaches that require a single entity (e.g., cloud services provider or a device vendor) implement major portions of the attestation infrastructure and own a significant portion of the attestation workflow operations. However, in such scenarios, a single entity would be required to own or control major portions of the attestation processing; the use of a single entity does not fit well with actual and envisioned behaviors in supply chains and in edge computing. These and other limitations of existing approaches are addressed with the following disclosure.

The present techniques and configurations for attestation may be utilized in connection with many aspects of deployed devices, including with reference to Edge Cloud, IoT, Multi-access Edge Computing (MEC), and other distributed computing deployments. However, the presently disclosed techniques may relate to other computing configurations and architecture, and are not limited to the use in a distributed computing environment. An example introduction of edge computing and IoT devices is provided below, followed by a detailed discussion of the present device attestation scenarios.

Example Edge Computing Architectures

FIG. 1 is a block diagram 100 showing an overview of a configuration for edge computing, which includes a layer of processing referenced in many of the current examples as an "edge cloud". This network topology, which may include a number of conventional networking layers (including those not shown herein), may be extended through use of the attestation techniques and network configurations discussed herein.

As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer end point devices than at a base station or at a central office). However, the closer that the edge location is to the endpoint (e.g., UEs), the more that space and power is constrained. Thus, edge computing, as a general design principle, attempts to minimize the resources needed for network services, through the distribution of more resources which are located closer both geographically and in-network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86, AMD or ARM hardware architectures) implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Within edge computing networks, there may be scenarios in services in which the compute resource will be "moved" to the data, as well as scenarios in which the data will be "moved" to the compute resource. Or as an example, base station compute, acceleration and network resources can provide services to scale to workload demands on an as-needed basis by activating dormant capacity (subscription, capacity-on-demand) to manage corner cases, emergencies or to provide longevity for deployed resources over a significantly longer implemented lifecycle. These and other scenarios may involve the use of attestation, as provided in the discussion below.

In contrast to the network architecture of FIG. 1, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 2:
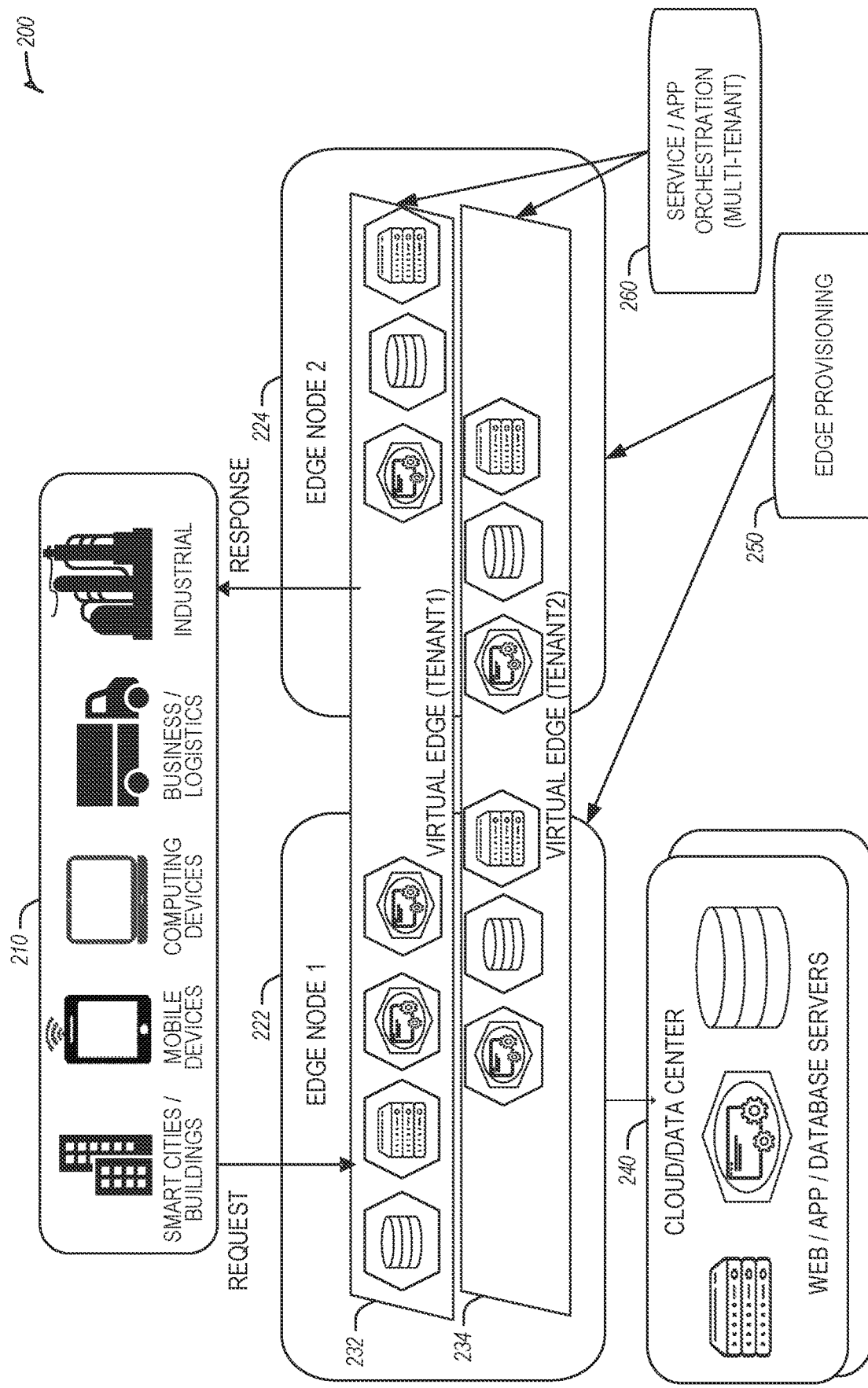
FIG. 2 illustrates deployment and orchestration for virtual edge configurations across an edge computing system operated among multiple edge nodes and multiple tenants, according to an example.

FIG. 2 illustrates deployment and orchestration for virtual edge configurations across an edge computing system operated among multiple edge nodes and multiple tenants. Specifically, FIG. 2 depicts coordination of a first edge node 222 and a second edge node 224 in an edge computing system 200, to fulfill requests and responses for various client endpoints 210 (e.g., smart cities/building systems, mobile devices, computing devices, business/logistics systems, industrial systems, etc.), which access various virtual edge instances. The virtual edge instances 232, 234 (or virtual edges) provide edge compute capabilities and processing in an edge cloud, with access to a cloud/data center 240 for higher-latency requests for websites, applications, database servers, etc. Thus, the edge cloud enables coordination of processing among multiple edge nodes for multiple tenants or entities.

In the example of FIG. 2, these virtual edge instances include: a first virtual edge 232, offered to a first tenant (Tenant 1), which offers a first combination of edge storage, computing, and services; and a second virtual edge 234, offering a second combination of edge storage, computing, and services, to a second tenant (Tenant 2). The virtual edge instances 232, 234 are distributed among the edge nodes 222, 224, and may include scenarios in which a request and response are fulfilled from the same or different edge nodes. The configuration of each edge node 222, 224 to operate in a distributed yet coordinated fashion occurs based on edge provisioning functions 250. The functionality of the edge nodes 222, 224 to provide coordinated operation for applications and services, among multiple tenants, occurs based on orchestration functions 260.

It should be understood that some of the devices in 210 are multi-tenant devices where Tenant1 may function within a Tenant1 'slice' while a Tenant2 may function within a Tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant-specific RoT. A RoT may further be computed dynamically composed using a security architecture, such as a DICE (Device Identity Composition Engine) architecture where a DICE hardware building block is used to construct layered trusted computing base contexts for secured and authenticated layering of device capabilities (such as with use of a Field Programmable Gate Array (FPGA)). The RoT also may be used for a trusted computing context to support respective tenant operations, etc. Use of this RoT and the security architecture may be enhanced by the attestation operations further discussed herein.

Edge computing nodes may partition resources (memory, central processing unit (CPU), graphics processing unit (GPU), interrupt controller, input/output (I/O) controller, memory controller, bus controller, etc.) where respective partitionings may contain an RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices in 210, 222, and 240 may coordinate the establishment of a distributed trusted computing base (DTCB) such that a tenant-specific virtual trusted secure channel linking all elements end to end can be established.

Further, it will be understood that a container may have data or workload-specific keys protecting its content from a previous edge node. As part of the migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

For instance, the edge computing system may be extended to provide orchestration of multiple applications through the use of containers (a contained, deployable unit of software that provides code and needed dependencies), in a multi-owner, multi-tenant environment. A multi-tenant orchestrator may be used to perform key management, trust anchor management, and other security functions related to the provisioning and lifecycle of the trusted 'slice' concept in FIG. 2. An orchestrator may use a DICE layering and fan-out construction to create a root of trust context that is tenant-specific. Thus, orchestration functions, provided by an orchestrator, may participate as a tenant-specific orchestration provider.

Accordingly, an edge computing system may be configured to fulfill requests and responses for various client endpoints from multiple virtual edge instances (and, from a cloud or remote data center, not shown). The use of these virtual edge instances supports multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications, latency sensitive applications, latency critical applications, user plane applications, networking applications, etc.). The virtual edge instances may also be spanned across systems of multiple owners at different geographic locations (or, respective computing systems and resources which are co-owned or co-managed by multiple owners).

For instance, each edge node 222, 224 may implement the use of containers, such as with the use of a container "pod" 226, 228 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices of virtual edges 232, 234 are partitioned according to the needs of each container.

With the use of container pods, a pod controller oversees the partitioning and allocation of containers and resources. The pod controller receives instructions from an orchestrator (e.g., performing orchestration functions 260) that instructs the controller on how best to partition physical resources and for what duration, such as by receiving key performance indicator (KPI) targets based on SLA contracts. The pod controller determines which container requires which resources and for how long to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents the assignment of resources until the right tenant authenticates or prevents provisioning of data or a workload to a container until an attestation result is satisfied.

Also, with the use of container pods, tenant boundaries can still exist but in the context of each pod of containers. If each tenant-specific pod has a tenant-specific pod controller, there will be a shared pod controller that consolidates resource allocation requests to avoid typical resource starvation situations. Further controls may be provided to ensure the attestation and trustworthiness of the pod and pod controller. For instance, the orchestrator 260 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked before the second pod executing.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. This arrangement may be adapted for use by multiple tenants in system arrangement, where containerized pods, functions, and functions-as-a-service instances are launched within virtual machines specific to each tenant (aside the execution of virtualized network functions).

Within the edge cloud, a first edge node 222 (e.g., operated by a first owner) and a second edge node 224 (e.g., operated by a second owner) may operate or respond to a container orchestrator to coordinate the execution of various applications within the virtual edge instances offered for respective tenants. For instance, the edge nodes 222, 224 may be coordinated based on edge provisioning functions 250, while the operation of the various applications are coordinated with orchestration functions 260.

Various system arrangements may provide an architecture that treats VMs, Containers, and Functions equally in terms of application composition (and resulting applications are combinations of these three ingredients). Each ingredient may involve use of one or more accelerator (e.g., FPGA, ASIC) components as a local backend. In this manner, applications can be split across multiple edge owners, coordinated by an orchestrator.

Figure 3:
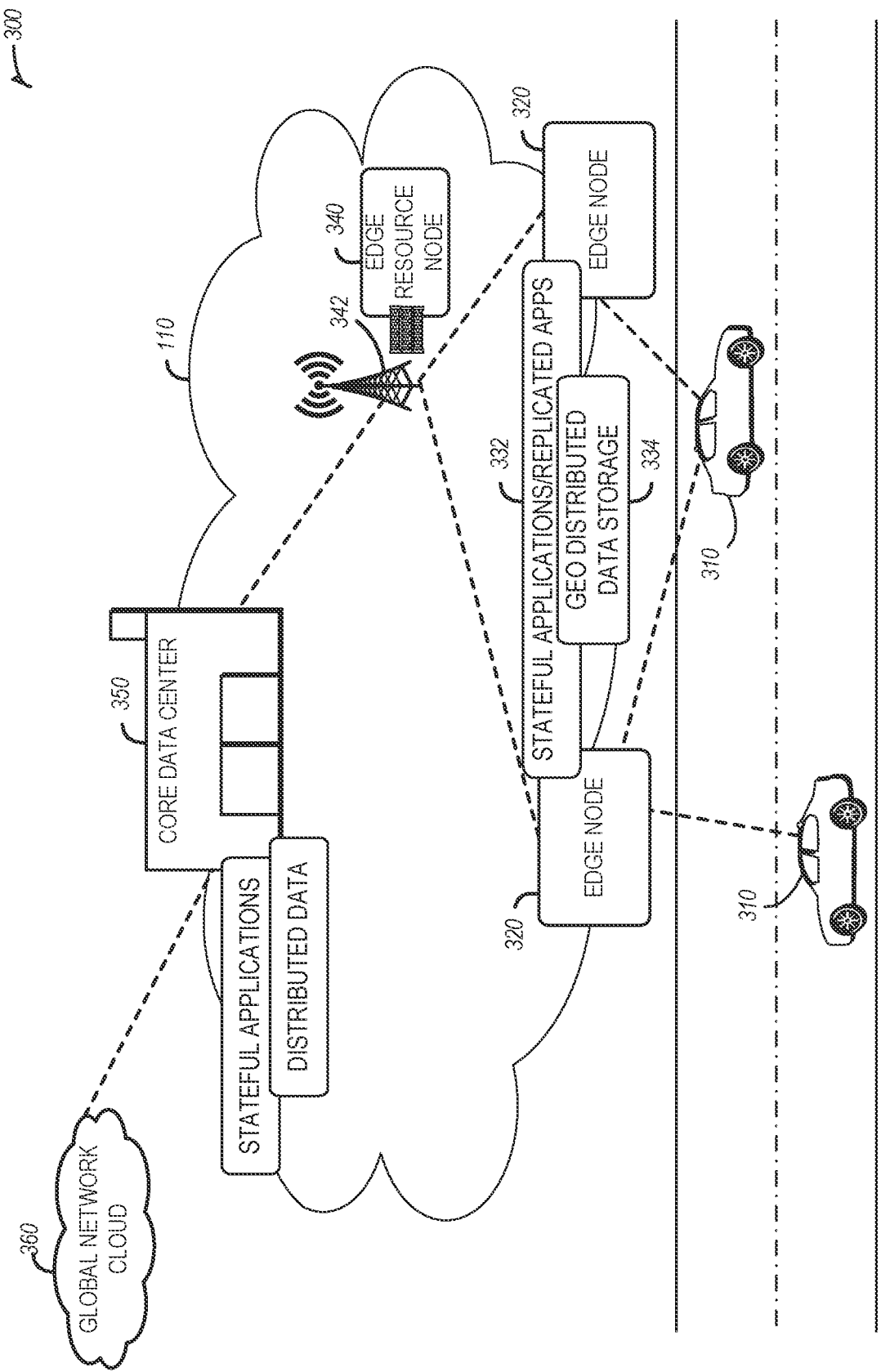
FIG. 3 illustrates a vehicle compute and communication use case involving mobile access to applications in an edge computing system, according to an example.

It should be appreciated that the edge computing systems and arrangements discussed herein may be applicable in various solutions, services, and/or use cases. As an example, FIG. 3 shows a simplified vehicle compute and communication use case involving mobile access to applications in an edge computing system 300 that implements an edge cloud 110. In this use case, each client compute node 310 may be embodied as in-vehicle compute systems (e.g., in-vehicle navigation and/or infotainment systems) located in corresponding vehicles that communicate with the edge gateway nodes 320 during traversal of a roadway. For instance, edge gateway nodes 320 may be located in roadside cabinets, which may be placed along the roadway, at intersections of the roadway, or other locations near the roadway. As each vehicle traverses along the roadway, the connection between its client compute node 310 and a particular edge gateway node 320 may propagate so as to maintain a consistent connection and context for the client compute node 310. Each of the edge gateway nodes 320 includes some processing and storage capabilities and, as such, some processing and/or storage of data for the client compute nodes 310 may be performed on one or more of the edge gateway nodes 320.

Each of the edge gateway nodes 320 may communicate with one or more edge resource nodes 340, which are illustratively embodied as compute servers, appliances or components located at or in a communication base station 342 (e.g., a base station of a cellular network). As discussed above, each edge resource node 340 includes some processing and storage capabilities and, as such, some processing and/or storage of data for the client compute nodes 310 may be performed on the edge resource node 340. For example, the processing of data that is less urgent or important may be performed by the edge resource node 340, while the processing of data that is of a higher urgency or importance may be performed by edge gateway devices or the client nodes themselves (depending on, for example, the capabilities of each component).

The edge resource node(s) 340 also communicate with the core data center 350, which may include compute servers, appliances, and/or other components located in a central location (e.g., a central office of a cellular communication network). The core data center 350 may provide a gateway to the global network cloud 360 (e.g., the Internet) for the edge cloud 110 operations formed by the edge resource node(s) 340 and the edge gateway nodes 320. Additionally, in some examples, the core data center 350 may include an amount of processing and storage capabilities and, as such, some processing and/or storage of data for the client compute devices may be performed on the core data center 350 (e.g., processing of low urgency or importance, or high complexity). The edge gateway nodes 320 or the edge resource nodes 340 may offer the use of stateful applications 332 and a geographic distributed data storage 334 (e.g., database, data store, etc.).

In further examples, FIG. 3 may utilize various types of mobile edge nodes, such as an edge node hosted in a vehicle (e.g., car, truck, tram, train, etc.) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 320, some others at the edge resource node 340, and others in the core data center 350 or global network cloud 360.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including a support of respective functions that support edge computing as a service. Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

Example Internet of Things Architectures

Figure 4:
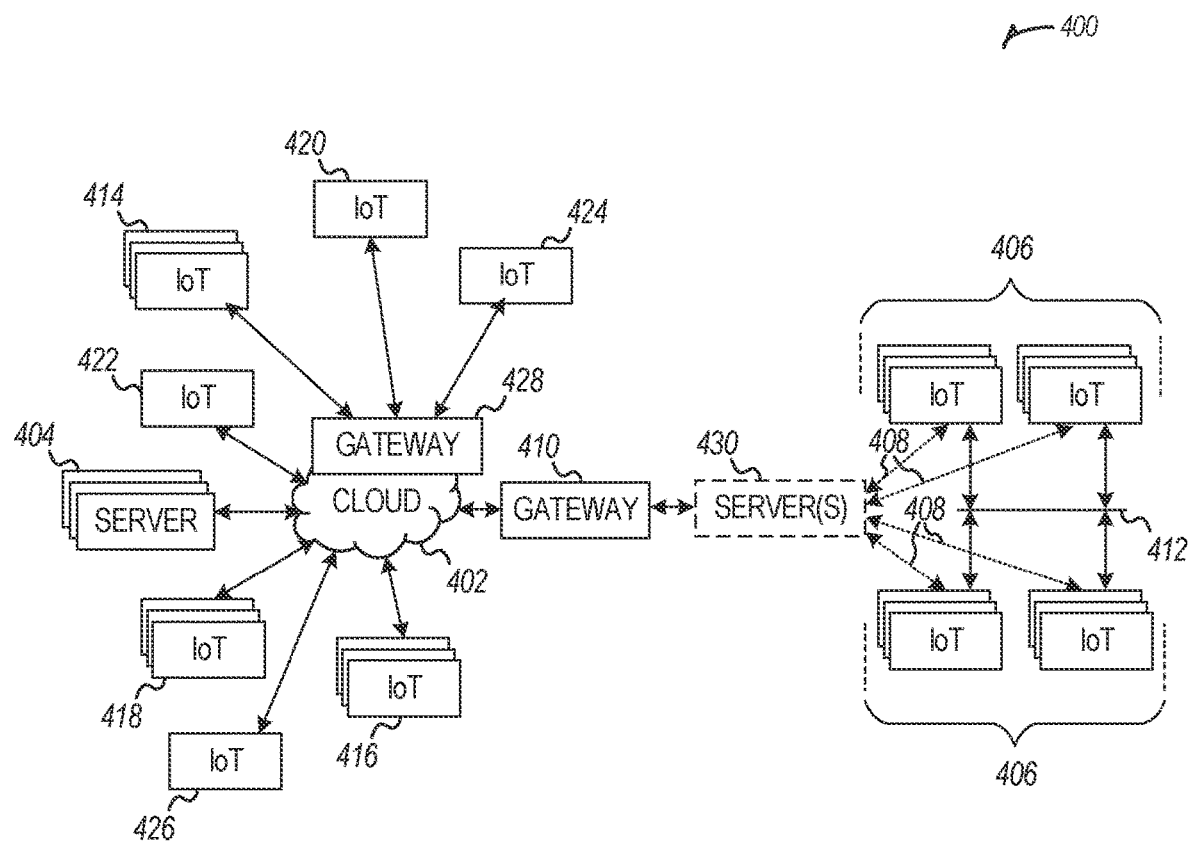
FIG. 4 illustrates a block diagram depicting deployment and communications among a number of Internet of Things (IoT) devices, according to an example.

As a more detailed illustration of an Internet of Things (IoT) network, FIG. 4 illustrates a drawing of a cloud or edge computing network, referred to as "cloud" 400, in communication with a number of IoT devices. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Returning to FIG. 4, the cloud 400 may represent the Internet, or may be a local area network (LAN), or a wide area network (WAN), such as a proprietary network for a company. The IoT devices may include any number of different types of devices, grouped in various combinations. For example, a traffic control group 406 may include IoT devices along streets in a city. These IoT devices may include stoplights, traffic flow monitors, cameras, weather sensors, and the like. The traffic control group 406, or other subgroups, may be in communication with the cloud 400 through wired or wireless links 408, such as LPWA links, optical links, and the like. Further, a wired or wireless sub-network 412 may allow the IoT devices to communicate with each other, such as through a local area network, a wireless local area network, and the like. The IoT devices may use another device, such as a gateway 410 or 428 to communicate with remote locations such as the cloud 400; the IoT devices may also use one or more servers 430 to facilitate communication with the cloud 400 or with the gateway 410. For example, the one or more servers 430 may operate as an intermediate network node to support a local edge cloud or fog implementation among a local area network. Further, the gateway 428 that is depicted may operate in a cloud-to-gateway-to-many edge devices configuration, such as with the various IoT devices 414, 420, 424 being constrained or dynamic to an assignment and use of resources in the cloud 400.

Other example groups of IoT devices may include remote weather stations 414, local information terminals 416, alarm systems 418, automated teller machines 420, alarm panels 422, or moving vehicles, such as emergency vehicles 424 or other vehicles 426, among many others. Each of these IoT devices may be in communication with other IoT devices, with servers 404, with another IoT device or system, another edge computing or "fog" computing system, or a combination therein. The groups of IoT devices may be deployed in various residential, commercial, and industrial settings (including in both private or public environments).

As may be seen from FIG. 4, a large number of IoT devices may be communicating through the cloud 400. This may allow different IoT devices to request or provide information to other devices autonomously. For example, a group of IoT devices (e.g., the traffic control group 406) may request a current weather forecast from a group of remote weather stations 414, which may provide the forecast without human intervention. Further, an emergency vehicle 424 may be alerted by an automated teller machine 420 that a burglary is in progress. As the emergency vehicle 424 proceeds towards the automated teller machine 420, it may access the traffic control group 406 to request clearance to the location, for example, by lights turning red to block cross traffic at an intersection in sufficient time for the emergency vehicle 424 to have unimpeded access to the intersection.

Clusters of IoT devices may be equipped to communicate with other IoT devices as well as with a cloud network. This may allow the IoT devices to form an ad-hoc network between the devices, allowing them to function as a single device, which may be termed a fog device or system. Clusters of IoT devices, such as may be provided by the remote weather stations 414 or the traffic control group 406, may be equipped to communicate with other IoT devices as well as with the cloud 400. This may allow the IoT devices to form an ad-hoc network between the devices, allowing them to function as a single device, which also may be termed a fog device or system.

In further examples, a variety of topologies may be used for IoT networks comprising IoT devices, with the IoT networks coupled through backbone links to respective gateways. For example, a number of IoT devices may communicate with a gateway, and with each other through the gateway. The backbone links may include any number of wired or wireless technologies, including optical networks, and may be part of a local area network (LAN), a wide area network (WAN), or the Internet. Additionally, such communication links facilitate optical signal paths among both IoT devices and gateways, including the use of MUXing/deMUXing components that facilitate interconnection of the various devices.

The network topology may include any number of types of IoT networks, such as a mesh network provided with the network using Bluetooth low energy (BLE) links. Other types of IoT networks that may be present include a wireless local area network (WLAN) network used to communicate with IoT devices through IEEE 802.11 (Wi-Fi®) links, a cellular network used to communicate with IoT devices through an LTE/LTE-A (4G) or 5G cellular network, and a low-power wide area (LPWA) network, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF).

Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources.

An IoT network, arranged as a mesh network, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

An IoT network, arranged as a WLAN network, for instance, may use systems that perform standards conversion to provide multi-standard connectivity, enabling IoT devices using different protocols to communicate. Further systems may provide seamless interconnectivity across a multi-standard infrastructure comprising visible Internet resources and hidden Internet resources.

An IoT network, using communications in the cellular network, for instance, may be enhanced by systems that offload data, extend communications to more remote devices, or both. A LPWA network may include systems that perform non-Internet protocol (IP) to IP interconnections, addressing, and routing. Further, each of the IoT devices may include the appropriate transceiver for wide area communications with that device. Further, each IoT device may include other transceivers for communications using additional protocols and frequencies.

In further examples, an edge or cloud computing network may be in communication with a mesh network of IoT devices at the edge of the cloud computing network. The mesh network of IoT devices may be termed a fog device or system, operating at the edge of the cloud. This fog device or system may be a massively interconnected network where a number of IoT devices are in communications with each other by radio links, for example. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Example Computing Devices

Figure 5:
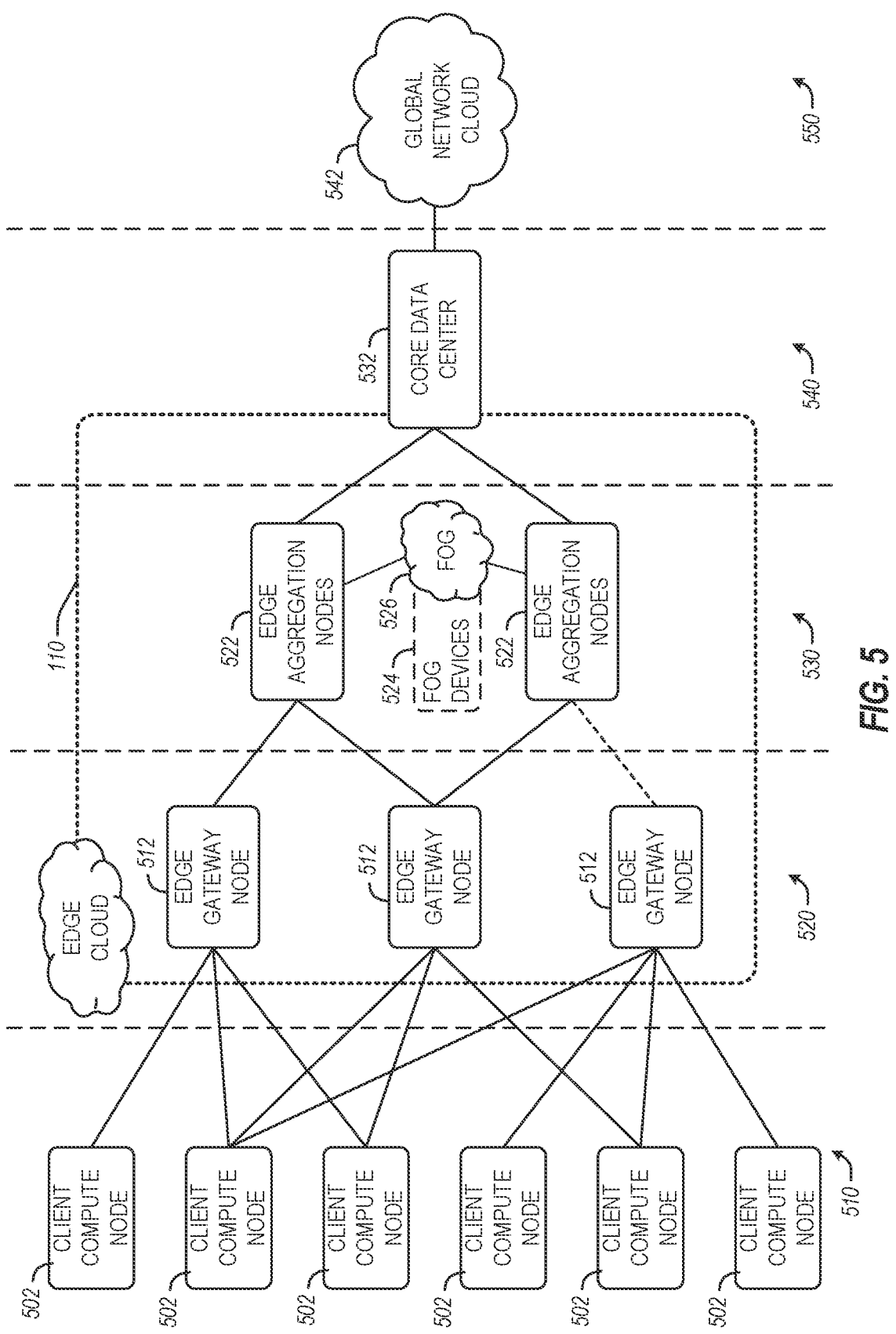
FIG. 5 illustrates an overview of layers of distributed compute deployed among an edge computing system, according to an example.

At a more generic level, an edge computing system may be described to encompass any number of deployments operating in the edge cloud 110, which provide coordination from client and distributed computing devices. FIG. 5 provides a further abstracted overview of layers of distributed compute deployed among an edge computing environment for purposes of illustration.

FIG. 5 generically depicts an edge computing system for providing edge services and applications to multi-stakeholder entities, as distributed among one or more client compute nodes 502, one or more edge gateway nodes 512, one or more edge aggregation nodes 522, one or more core data centers 532, and a global network cloud 542, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 510, 520, 530, 540, 550. For example, the client compute nodes 502 are each located at an endpoint layer 510, while each of the edge gateway nodes 512 are located at an edge devices layer 620 (local level) of the edge computing system. Additionally, each of the edge aggregation nodes 522 (and/or fog devices 524, if arranged or operated with or among a fog networking configuration 526) are located at a network access layer 630 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 532 is located at a core network layer 640 (e.g., a regional or geographically-central level), while the global network cloud 542 is located at a cloud data center layer 550 (e.g., a national or global layer). The use of "core" is provided as a term for a centralized network location-deeper in the network-which is accessible by multiple edge nodes or components; however, a "core" does not necessarily designate the "center" or the deepest location of the network. Accordingly, the core data center 532 may be located within, at, or near the edge cloud 110.

Although an illustrative number of client compute nodes 502, edge gateway nodes 512, edge aggregation nodes 522, core data centers 532, global network clouds 542 are shown in FIG. 5, it should be appreciated that the edge computing system may include more or fewer devices or systems at each layer. Additionally, as shown in FIG. 5, the number of components of each layer 510, 520, 530, 540, 550 generally increases at each lower level (i.e., when moving closer to endpoints). As such, one edge gateway node 512 may service multiple client compute nodes 502, and one edge aggregation node 522 may service multiple edge gateway nodes 512.

Consistent with the examples provided herein, each client compute node 502 may be embodied as any type of end point component, device, appliance, or "thing" capable of communicating as a producer or consumer of data. Further, the label "node" or "device" as used in the edge computing system 500 does not necessarily mean that such node or device operates in a client or agent/follow/minion role; rather, any of the nodes or devices in the edge computing system 500 refer to individual entities, nodes, or subsystems which include discrete or connected hardware or software configurations to facilitate or use the edge cloud 110.

As such, the edge cloud 110 is formed from network components and functional features operated by and within the edge gateway nodes 512 and the edge aggregation nodes 522 of layers 520, 530, respectively. The edge cloud 110 may be embodied as any type of network that provides edge computing and/or storage resources which are proximately located to radio access network (RAN) capable endpoint devices (e.g., mobile computing devices, IoT devices, smart devices, etc.), which are shown in FIG. 5 as the client compute nodes 502. In other words, the edge cloud 110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110 may form a portion of or otherwise provide an ingress point into or across a fog networking configuration 526 (e.g., a network of fog devices 524, not shown in detail), which may be embodied as a system-level horizontal and distributed architecture that distributes resources and services to perform a specific function. For instance, a coordinated and distributed network of fog devices 524 may perform computing, storage, control, or networking aspects in the context of an IoT system arrangement. Other networked, aggregated, and distributed functions may exist in the edge cloud 110 between the core data center layer 550 and the client endpoints (e.g., client compute nodes 502). Some of these are discussed in the following sections in the context of network functions or service virtualization, including the use of virtual edges and virtual services which are orchestrated for multiple stakeholders.

The edge gateway nodes 512 and the edge aggregation nodes 522 cooperate to provide various edge services and security to the client compute nodes 502. Furthermore, because each client compute node 502 may be stationary or mobile, each edge gateway node 512 may cooperate with other edge gateway devices to propagate presently provided edge services and security as the corresponding client compute node 502 moves about a region. To do so, each of the edge gateway nodes 512 and/or edge aggregation nodes 522 may support multiple tenancy and multiple stakeholder configurations, in which services from (or hosted for) multiple service providers and multiple consumers may be supported and coordinated across a single or multiple compute devices.

In various examples, the present memory monitoring techniques may be implemented among the client compute nodes 502 (e.g., at a client who receives an attestation token), at the edge gateway nodes 512 or aggregation nodes 522 (e.g., at a resource node which has a resource to be attested), and other intermediate nodes in the edge cloud 110 (e.g., which operate orchestrator functions, attestation service functions, etc.), as further discussed below with reference to the various configurations provided in FIGS. 7 to 11. Additionally, while reference to a "cloud verifier" is provided in many of the following examples, the verifier may also be located at various levels of the network 520, 530, 540.

In further examples, any of the compute nodes or devices discussed with reference to the present edge computing systems and environment may be fulfilled based on the components depicted in FIGS. 6A and 6B. Each edge compute node may be embodied as a type of device, appliance, computer, or other "thing" capable of communicating with other edge, networking, or endpoint components. For example, an edge compute device may be embodied as a personal computer, a server, smartphone, a mobile compute device, a smart appliance, an in-vehicle compute system (e.g., a navigation system), a self-contained device having an outer case, shell, etc., or other device or system capable of performing the described functions.

Figure 6A:
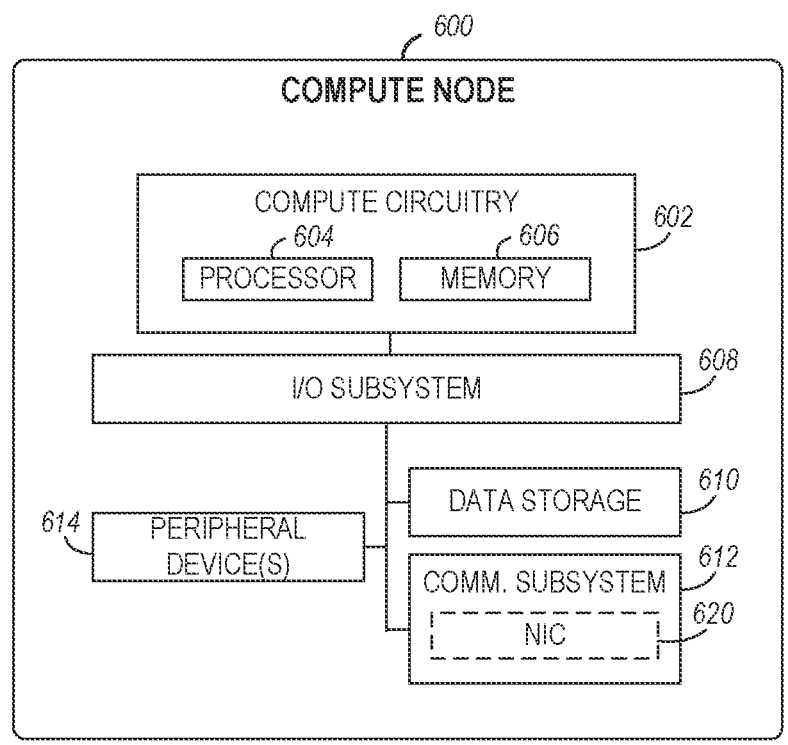
FIG. 6A illustrates an overview of example components deployed at a computing system, according to an example.

In the simplified example depicted in FIG. 6A, an edge compute node 600 includes a compute engine (also referred to herein as "compute circuitry") 602, an input/output (I/O) subsystem 608, data storage 610, a communication circuitry subsystem 612, and, optionally, one or more peripheral devices 614. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 600 may be embodied as any type of engine, device, or collection of devices capable of performing various compute functions. In some examples, the compute node 600 may be embodied as a single device such as an integrated circuit, an embedded system, a field-programmable gate array (FPGA), a system-on-a-chip (SOC), or other integrated system or device. In the illustrative example, the compute node 600 includes or is embodied as a processor 604 and a memory 606. The processor 604 may be embodied as any type of processor capable of performing the functions described herein (e.g., executing an application). For example, the processor 604 may be embodied as a multi-core processor(s), a microcontroller, a processing unit, a specialized or special purpose processing unit, or other processor or processing/controlling circuit.

In some examples, the processor 604 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI or specialized hardware (e.g., GPUs, programmed FPGAs, Network Processing Units (NPUs), Infrastructure Processing Units (IPUs), Storage Processing Units (SPUs), AI Processors (APUs), Data Processing Unit (DPUs), or other specialized accelerators such as a cryptographic processing unit/accelerator). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that an xPU, a SOC, a CPU, and other variations of the processor 704 may work in coordination with each other to execute many types of operations and instructions within and on behalf of the compute node 700.

The memory 606 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three-dimensional crosspoint memory device (e.g., Intel 3D XPoint™ memory), or other byte addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 606 may be integrated into the processor 604. The main memory 606 may store various software and data used during operation such as one or more applications, data operated on by the application(s), libraries, and drivers.

The compute circuitry 602 is communicatively coupled to other components of the compute node 600 via the I/O subsystem 608, which may be embodied as circuitry and/or components to facilitate input/output operations with the compute circuitry 602 (e.g., with the processor 604 and/or the main memory 606) and other components of the compute circuitry 602. For example, the I/O subsystem 608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 608 may form a portion of a system-on-a-chip (SoC) and be incorporated, along with one or more of the processor 604, the main memory 606, and other components of the compute circuitry 602, into the compute circuitry 602.

The one or more illustrative data storage devices 610 may be embodied as any type of devices configured for short-term or long-term storage of data such as, for example, memory devices and circuits, memory cards, hard disk drives, solid-state drives, or other data storage devices. Each data storage device 610 may include a system partition that stores data and firmware code for the data storage device 610. Each data storage device 610 may also include one or more operating system partitions that store data files and executables for operating systems depending on, for example, the type of compute node 600.

The communication circuitry 612 may be embodied as any communication circuit, device, or collection thereof, capable of enabling communications over a network between the compute circuitry 602 and another compute device (e.g., an edge gateway node 512 of the edge computing system 500). The communication circuitry 612 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, low-power wide-area network (LPWAN) or low-power wide-area (LPWA) protocols, etc.) to effect such communication.

The illustrative communication circuitry 612 includes a network interface controller (NIC) 620, which may also be referred to as a host fabric interface (HFI). The NIC 620 may be embodied as one or more add-in-boards, daughter cards, network interface cards, controller chips, chipsets, or other devices that may be used by the compute node 600 to connect with another compute device (e.g., an edge gateway node 512). In some examples, the NIC 620 may be embodied as part of a system-on-a-chip (SoC) that includes one or more processors, or included on a multichip package that also contains one or more processors. In some examples, the NIC 620 may include a local processor (not shown) and/or a local memory (not shown) that are both local to the NIC 620. In such examples, the local processor of the NIC 620 may be capable of performing one or more of the functions of the compute circuitry 602 described herein. Additionally or alternatively, in such examples, the local memory of the NIC 620 may be integrated into one or more components of the client compute node at the board level, socket level, chip level, and/or other levels.

Additionally, in some examples, each compute node 600 may include one or more peripheral devices 614. Such peripheral devices 614 may include any type of peripheral device found in a compute device or server such as audio input devices, a display, other input/output devices, interface devices, and/or other peripheral devices, depending on the particular type of the compute node 600. In further examples, the compute node 600 may be embodied by a respective edge compute node in an edge computing system (e.g., client compute node 502, edge gateway node 512, edge aggregation node 522) or like forms of appliances, computers, subsystems, circuitry, or other components.

Figure 6B:
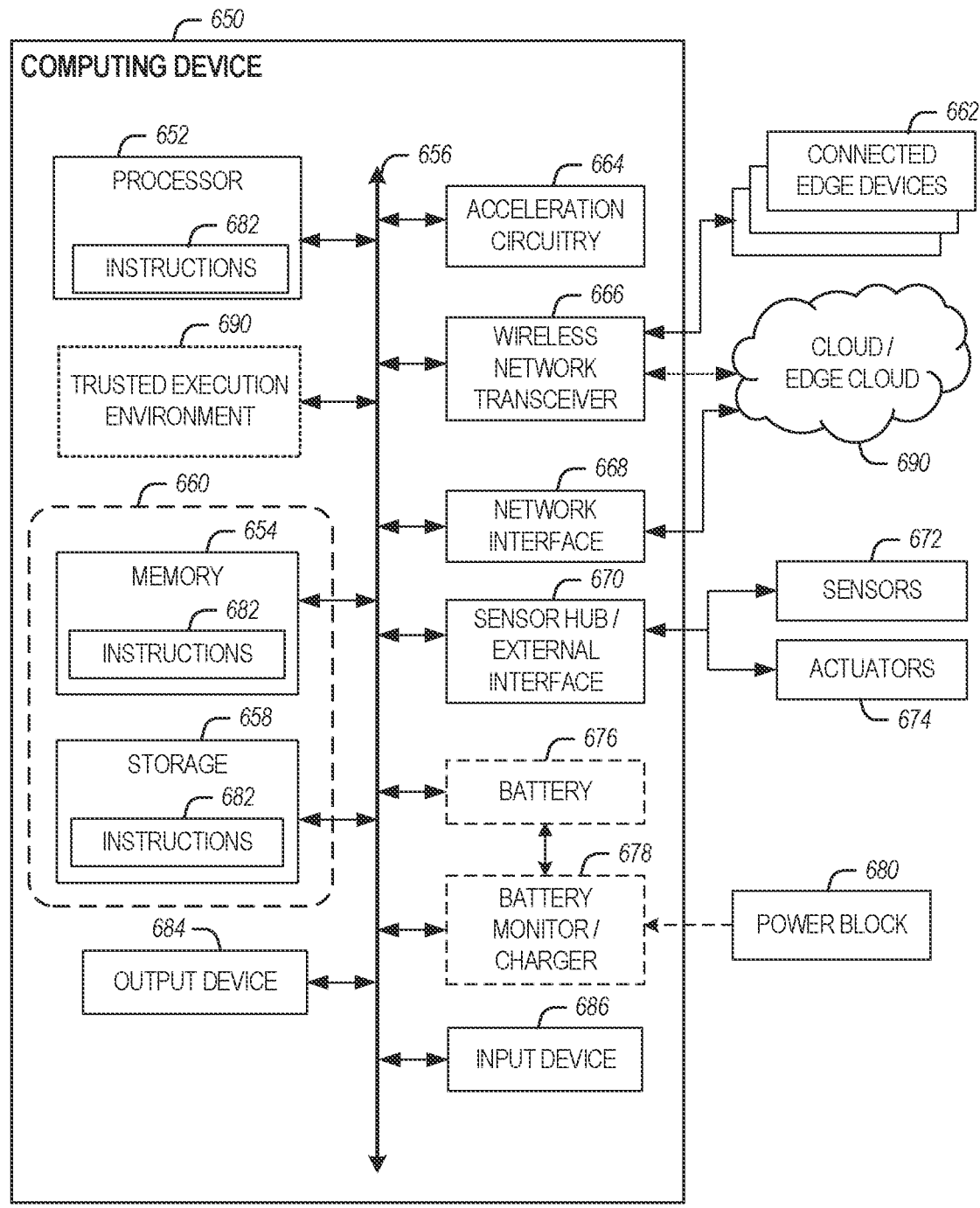
FIG. 6B illustrates a further overview of example components within a computing device, according to an example.

In a more detailed example, FIG. 6B illustrates a block diagram of an example of components that may be present in an edge computing node 650 for implementing the techniques (e.g., operations, processes, methods, and methodologies) described herein. This edge computing node 650 provides a closer view of the respective components of node 600 when implemented as or as part of a computing device (e.g., as a mobile device, a base station, server, gateway, etc.). The edge computing node 650 may include any combinations of the components referenced above, and it may include any device usable with an edge communication network or a combination of such networks. The components may be implemented as integrated circuits (ICs), portions thereof, discrete electronic devices, or other modules, logic, instruction sets, programmable logic or algorithms, hardware, hardware accelerators, software, firmware, or a combination thereof adapted in the edge computing node 650, or as components otherwise incorporated within a chassis of a larger system.

The edge computing node 650 may include processing circuitry in the form of a processor 652, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 652 may be a part of a system on a chip (SoC) in which the processor 652 and other components are formed into a single integrated circuit, or a single package, such as the Edison™ or Galileo™ SoC boards from Intel Corporation, Santa Clara, California. As an example, the processor 652 may include an Intel® Architecture Core™ based processor, such as a Quark™, an Atom™, an i3, an i5, an i7, an i9, or an MCU-class processor, or another such processor available from Intel®. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 652 and accompanying circuitry may be provided in a single socket form factor, multiple socket form factor, or a variety of other formats, including in limited hardware configurations or configurations that include fewer than all elements shown in FIG. 6B.

The processor 652 may communicate with a system memory 654 over an interconnect 656 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 658 may also couple to the processor 652 via the interconnect 656. In an example, the storage 658 may be implemented via a solid-state disk drive (SSDD). Other devices that may be used for the storage 658 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 658 may be on-die memory or registers associated with the processor 652. However, in some examples, the storage 658 may be implemented using a micro hard disk drive (HDD). Further, any number of new technologies may be used for the storage 658 in addition to, or instead of, the technologies described, such resistance change memories, phase change memories, holographic memories, or chemical memories, among others.

The components may communicate over the interconnect 656. The interconnect 656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 656 may be a proprietary bus, for example, used in an SoC based system. Other bus systems may be included, such as an I2C interface, an SPI interface, point to point interfaces, and a power bus, among others.

The interconnect 656 may couple the processor 652 to a transceiver 666, for communications with the connected edge devices 662. The transceiver 666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 666 (or multiple transceivers) may communicate using multiple standards or radios for communications at a different range. For example, the edge computing node 650 may communicate with close devices, e.g., within about 10 meters, using a local transceiver based on BLE, or another low power radio, to save power. More distant connected edge devices 662, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 666 (e.g., a radio transceiver) may be included to communicate with devices or services in the edge cloud 690 via local or wide area network protocols. The wireless network transceiver 666 may be an LPWA transceiver that follows the IEEE 802.15.4, or IEEE 802.15.4g standards, among others. The edge computing node 650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 666, as described herein. For example, the transceiver 666 may include a cellular transceiver that uses spread spectrum (SPA/SAS) communications for implementing high-speed communications. Further, any number of other protocols may be used, such as Wi-Fi® networks for medium speed communications and provision of network communications. The transceiver 666 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 668 may be included to provide a wired communication to nodes of the edge cloud 690 or to other devices, such as the connected edge devices 662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 668 may be included to enable connecting to a second network, for example, a first NIC 668 providing communications to the cloud over Ethernet, and a second NIC 668 providing communications to other devices over another type of network.

Given the variety of types of applicable communications from the device to another component or network, applicable communications circuitry used by the device may include or be embodied by any one or more of components 664, 666, 668, or 670. Accordingly, in various examples, applicable means for communicating (e.g., receiving, transmitting, etc.) may be embodied by such communications circuitry.

The edge computing node 650 may include or be coupled to acceleration circuitry 664, which may be embodied by one or more AI accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 656 may couple the processor 652 to a sensor hub or external interface 670 that is used to connect additional devices or subsystems. The devices may include sensors 672, such as accelerometers, level sensors, flow sensors, optical light sensors, camera sensors, temperature sensors, a global navigation system (e.g., CPS) sensors, pressure sensors, barometric pressure sensors, and the like. The hub or interface 670 further may be used to connect the edge computing node 650 to actuators 674, such as power switches, valve actuators, an audible sound generator, a visual warning device, and the like.

In some optional examples, various input/output (I/O) devices may be present within or connected to, the edge computing node 650. For example, a display or other output device 684 may be included to show information, such as sensor readings or actuator position. An input device 686, such as a touch screen or keypad may be included to accept input. An output device 684 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 650. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 676 may power the edge computing node 650, although, in examples in which the edge computing node 650 is mounted in a fixed location, it may have a power supply coupled to an electrical grid, or the battery may be used as a backup or for temporary capabilities. The battery 676 may be a lithium ion battery, or a metal-air battery, such as a zinc-air battery, an aluminum-air battery, a lithium-air battery, and the like.

A battery monitor/charger 678 may be included in the edge computing node 650 to track the state of charge (SoCh) of the battery 676. The battery monitor/charger 678 may be used to monitor other parameters of the battery 676 to provide failure predictions, such as the state of health (SoH) and the state of function (SoF) of the battery 676. The battery monitor/charger 678 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 678 may communicate the information on the battery 676 to the processor 652 over the interconnect 656. The battery monitor/charger 678 may also include an analog-to-digital (ADC) converter that enables the processor 652 to directly monitor the voltage of the battery 676 or the current flow from the battery 676. The battery parameters may be used to determine actions that the edge computing node 650 may perform, such as transmission frequency, mesh network operation, sensing frequency, and the like.

A power block 680, or other power supply coupled to a grid, may be coupled with the battery monitor/charger 678 to charge the battery 676. In some examples, the power block 680 may be replaced with a wireless power receiver to obtain the power wirelessly, for example, through a loop antenna in the edge computing node 650. A wireless battery charging circuit, such as an LTC4020 chip from Linear Technologies of Milpitas, California, among others, may be included in the battery monitor/charger 678. The specific charging circuits may be selected based on the size of the battery 676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 658 may include instructions 682 in the form of software, firmware, or hardware commands to implement the techniques described herein. Although such instructions 682 are shown as code blocks included in the memory 654 and the storage 658, it may be understood that any of the code blocks may be replaced with hardwired circuits, for example, built into an application specific integrated circuit (ASIC).

Also in a specific example, the instructions 682 on the processor 652 (separately, or in combination with the instructions 682 of the machine readable medium 660) may configure execution or operation of a trusted execution environment (TEE) 695. In an example, the TEE 695 operates as a protected area accessible to the processor 652 for secure execution of instructions and secure access to data. Various implementations of the TEE 695, and an accompanying secure area in the processor 652 or the memory 654 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 650 through the TEE 695 and the processor 652.

In an example, the instructions 682 provided via the memory 654, the storage 658, or the processor 652 may be embodied as a non-transitory, machine-readable medium 660 including code to direct the processor 652 to perform electronic operations in the edge computing node 650. The processor 652 may access the non-transitory, machine-readable medium 660 over the interconnect 656. For instance, the non-transitory, machine-readable medium 660 may be embodied by devices described for the storage 658 or may include specific storage units such as optical disks, flash drives, or any number of other hardware devices. The non-transitory, machine-readable medium 660 may include instructions to direct the processor 652 to perform a specific sequence or flow of actions, for example, as described with respect to the flowchart(s) and block diagram(s) of operations and functionality depicted above. As used herein, the terms "machine-readable medium", "computer-readable medium", "machine-readable storage", and "computer-readable storage" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 6C:
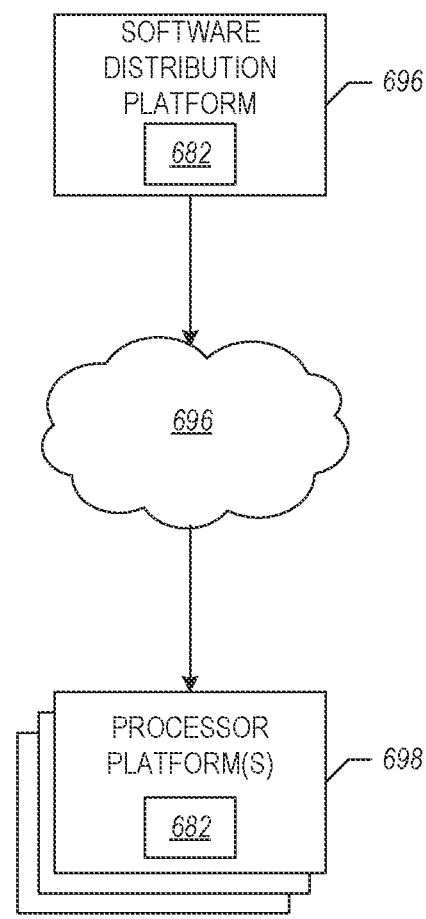
FIG. 6C illustrates a software distribution platform provided by computing systems, according to an example.

FIG. 6C illustrates an example software distribution platform 696 to distribute software, such as example computer-readable instructions 699, to one or more devices, such as processor platform(s) 698 and/or example connected edge devices 662 of FIG. 6B. The example software distribution platform 696 may be implemented by any computer server, data facility, cloud service, etc., capable of storing and transmitting software to other computing devices (e.g., third parties, the example connected edge devices 662 of FIG. 6B). Example connected edge devices may be customers, clients, managing devices (e.g., servers), third parties (e.g., customers of an entity owning and/or operating the software distribution platform 696). Example connected edge devices may operate in commercial and/or home automation environments. In some examples, a third party is a developer, a seller, and/or a licensor of software such as the example computer-readable instructions 699. The third parties may be consumers, users, retailers, OEMs, etc. that purchase and/or license the software for use and/or re-sale and/or sub-licensing. In some examples, distributed software causes the display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 6C, the software distribution platform 696 includes one or more servers and one or more storage devices. The storage devices store the computer-readable instructions 699, which may correspond to the example computer-readable instructions 682 of FIG. 6B, as described above. The one or more servers of the example software distribution platform 696 are in communication with a network 697, which may correspond to any one or more of the Internet and/or any of the example networks described herein. In some examples, the one or more servers are responsive to requests to transmit the software to a requesting party as part of a commercial transaction. Payment for the delivery, sale, and/or license of the software may be handled by the one or more servers of the software distribution platform and/or via a third-party payment entity. The servers enable purchasers and/or licensors to download the computer-readable instructions 699 from the software distribution platform 696. For example, the software, which may correspond to the example computer-readable instructions 682 of FIG. 6B, may be downloaded to the example processor platform(s) 698 (e.g., example connected edge devices), which is/are to execute the computer-readable instructions 699 to implement the techniques discussed herein. In some examples, one or more servers of the software distribution platform 696 are communicatively connected to one or more security domains and/or security devices through which requests and transmissions of the example computer-readable instructions 699 must pass. In some examples, one or more servers of the software distribution platform 696 periodically offer, transmit, and/or force updates to the software (e.g., the example computer-readable instructions 682 of FIG. 6B which can be the same as the computer-readable instructions 699) to ensure improvements, patches, updates, etc. are distributed and applied to the software at the end-user devices.

In the illustrated example of FIG. 6C, the computer-readable instructions 699 are stored on storage devices of the software distribution platform 696 in a particular format. A format of computer-readable instructions includes, but is not limited to a particular code language (e.g., Java, JavaScript, Python, C, C #, SQL, HTML, etc.), and/or a particular code state (e.g., uncompiled code (e.g., ASCII), interpreted code, linked code, executable code (e.g., a binary), etc.). In some examples, the computer-readable instructions 699 stored in the software distribution platform 696 are in a first format when transmitted to the example processor platform(s) 696. In some examples, the first format is an executable binary in which particular types of the processor platform(s) 698 can execute. However, in some examples, the first format is uncompiled code that requires one or more preparation tasks to transform the first format to a second format to enable execution on the example processor platform(s) 698. For instance, the receiving processor platform(s) 698 may need to compile the computer-readable instructions 699 in the first format to generate executable code in a second format that is capable of being executed on the processor platform (s) 698. In still other examples, the first format is interpreted code that, upon reaching the processor platform(s) 698, is interpreted by an interpreter to facilitate execution of instructions.

Each of the block diagrams of FIGS. 6A and 6B are intended to depict a high-level view of components of a device, subsystem, or arrangement of an edge computing node. However, it will be understood that some of the components shown may be omitted, additional components may be present, and a different arrangement of the components shown may occur in other implementations.

Approaches for Device Attestation

In the following examples, a 'template' or composition of device modules, components, sub-components, environments and measurements (a.k.a., claims) can be described using an abstraction via a notation and schema (such as IETF CoSWTD) to indicate that a member of a supply chain asserts or intends to assert that the composition, as a logical representation of an attestable device, is intended or endorsed by said supplier (a.k.a., endorser). The supply chain stakeholders (a.k.a., suppliers/endorsers) use the schema to assert ownership and to assign reference values; which define both the supplier that is authorized to contribute reference values and which reference values are intended for a given module or element in a logical device representation otherwise described as a composition. As used herein, the following uses the terms "module", "component", or and "element" interchangeably to refer to such items.

The use of a composition also may describe a library of device patterns, for example, via the DICE Layering Architecture specification defined by the Trusted Computing Group (TCG). DICE defines a 'layered device' pattern which describes a sequence in which a device must be booted and initialized in a particular sequence to be accepted as a legitimate or trustworthy device. The template specifies which modules (e.g., components, sub-components, environments or elements) belong to a particular layer and which other modules belong to the composition. As such, other supply chain entities are not authorized to deviate from the composition expressed by the actual device manufacturer. Nevertheless, as a module supplier to one of the modules of the composition, may supply reference measurements or other endorsed claims that pertain to the respective modules.

Furthermore, operational procedures such as claims collection and attestation evidence verification processes my use a manifest containing compositions to direct verification processing work so that the reference and endorsement measurements can be matched and reliably associated with attester evidence. Manifest compositions therefore have both syntactic and semantic properties that may be understood by a generalized verifier.

Device Attestation Examples

In the context of a deployed device (such as the edge computing device(s) depicted in FIG. 5) the present techniques and configurations provide the capability for end-to-end attestation, in a verifiable framework, where any combination of endpoints between 510, 520, 530, 540 and 550 may be constructed to implement any attestation role (e.g., as defined by IETF RATS Attestation Architecture). This is provided from the use of a defined manifest structure that specifies a logical composition of modules (e.g., device, component, sub-component, environment, element and measurement). Such compositions are useful in the context of device attestation where a root of trust (RoT) element may transition into a trusted computing environment that may collect claims about a target environment, and so forth, to form a layering of trusted computing base (TCB) environments or other composition of TCBs that are described by the manifest tags.

This manifest tag is a structure that contains a set of compositional statements. The manifest tag therefore describes a template for a particular class of device. The template may control (or give guidance for) how other supply chain entities construct 'reference' measurements that are also associated with the modules of a composition which are then incorporated into a manifest. The main objectives of manifests are to supply reference and endorsed measurements about the actual construction of a device and to describe a "drill down" decomposition of the device that any generalized verifier can navigate.

The manifest may identify an 'owner' for a given module (or a sub-tree of modules) where the owner is authorized to specify reference and endorsed measurements/claims. The 'owner' may be another supply chain entity, service provider, enterprise or user. Alternatively, or additionally the manifest may leave the owner unspecified or my imply an ownership semantic by signing a manifest. A supply chain entity may assert ownership independently of the manifest, but if asserted, a voucher or other similar mechanism may be used to establish ownership rights. For example, an original equipment manufacturer (OEM) might create a manifest that links to other supply chain entity created manifests that supply reference and endorsed measurements as a way of asserting that these entities are the ones authorized as owner of a module or set of modules. The template also may be used to inform attesters (or the designers of attesters) which claims should be collected and the programmatic behavior of claims collection. The template may also automate or otherwise parameterize the collection algorithm regarding which claims are intended/meaningful as attestation evidence.

The manifest tag compositions (e.g., template) may be linked across other manifest tag composition to form a 'pool' that together describes a computing device (or other manufactured good). The pool may link to or otherwise reference other related attestation endorsement structures such as digital certificates, software manifests, software update packages, patches, etc. that further identifies or describes a particular device class or particular device instances. This may be referred to as an 'instance' manifest/tag/measurement because; for every instance there will be a measurement value that is unique to each device/module instance. Alternatively, a device/module class exists when the same model describes all device instances produced. Consequently a single manifest/tag that describes the 'class' of device/module may be minted and replicated or otherwise shared across a broad community of verifiers.

Manifests may be defined according to a schema and signing convention such as is defined by the ISO/IEC 19770-2 "SWTD" (Software Identity) schema or IETF Concise SWID Tag (CoSWID) or another manifest schema. Examples of such manifests are provided in more detail below.

Figure 7:
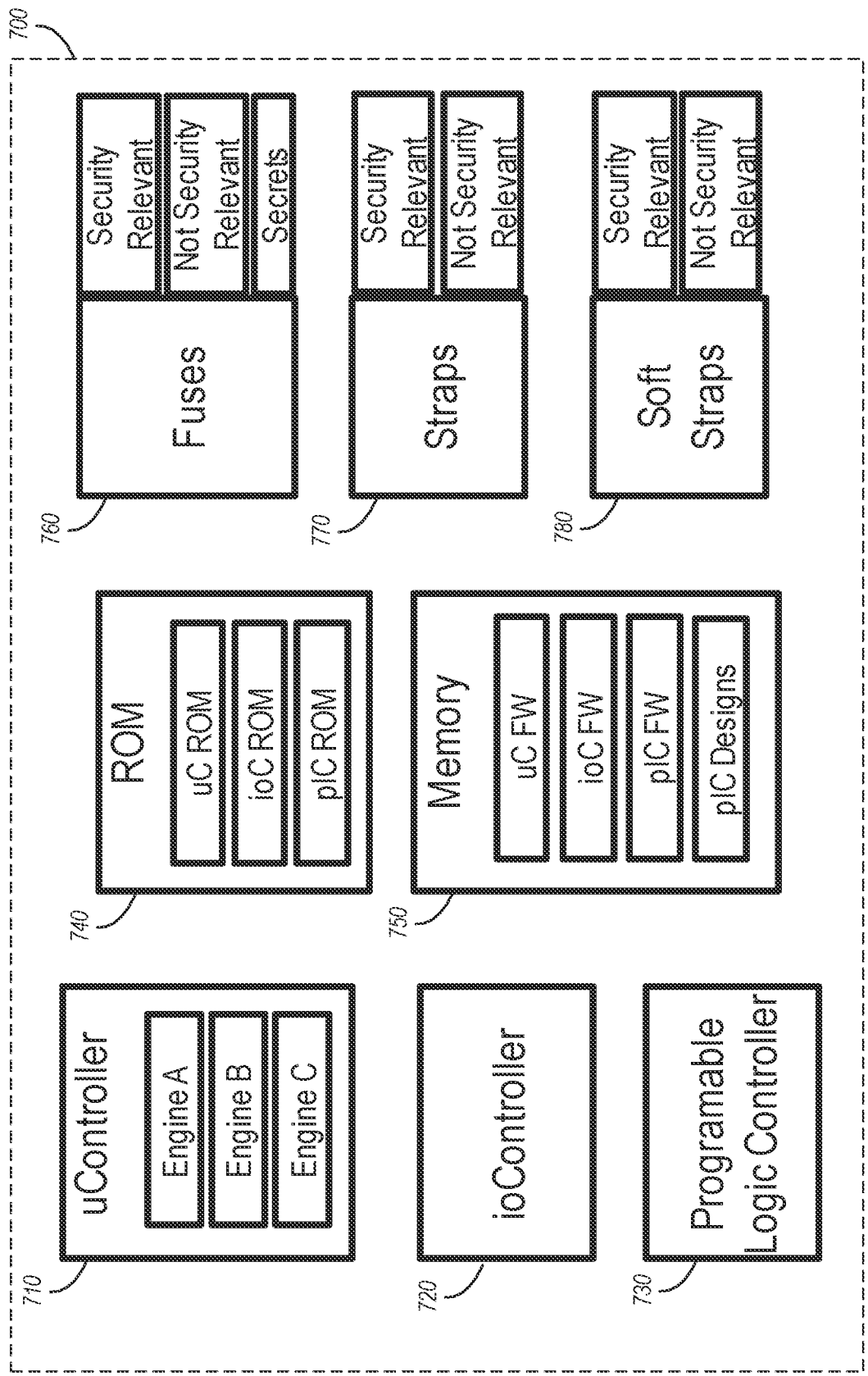
FIG. 7 illustrates a logical device with measurable hardware components, used in an attestation approach, according to an example.

FIG. 7 provides a representation of a logical device 700 containing common modules or elements that can be considered 'measurable' hardware components. This example logical device 700 includes multiple sub-components depicted in FIG. 7 (e.g., a microcontroller 710, I/O controller 720, programmable logic controller 730 with programmable regions, ROM 740, memory 750, and fuses 760, straps 770 (e.g., fused links or jumpers, and the like), and/or soft straps 780). Based on the configuration of the logical device 700, an attestation manifest creation approach may compute reference values for the modules of the device based on the several considerations that may include but are not limited to the following: Is the feature security relevant? (use an actual value) Can it change? (Use a digest) Does it have intrinsic security properties? (Use a static claim) Is it a secret? (Ignore).

There may be multiple measurement algorithms applicable to the attestation of the sub-components of FIG. 7, according to an expected usage or use case context. For example, a set of fuse values (of fuses 760) may hash to a digest that is effective for detecting changes or differences but does not reveal discrete values. Another algorithm may copy actual values, as such actual values may be important for assessing the security state or posture of a device or component. Another algorithm may apply a conditional or partial reference value by supplying a bit mask to a bit array of values where the mask determines which bits in the bit array are appropriate to view for the purposes of attestation appraisals. Other sub-components or elements may contain secrets and therefore are not permitted to contain reference values. Nevertheless, the existence of an element for holding secrets may be acknowledged so that static or 'intrinsic' claims can be asserted by a supply chain entity to a verifier for the purpose of assessing how trustworthy secrets are protected, which industry certifications the module complies with, or processes followed by the manufacturer to ensure quality.

Figure 8:
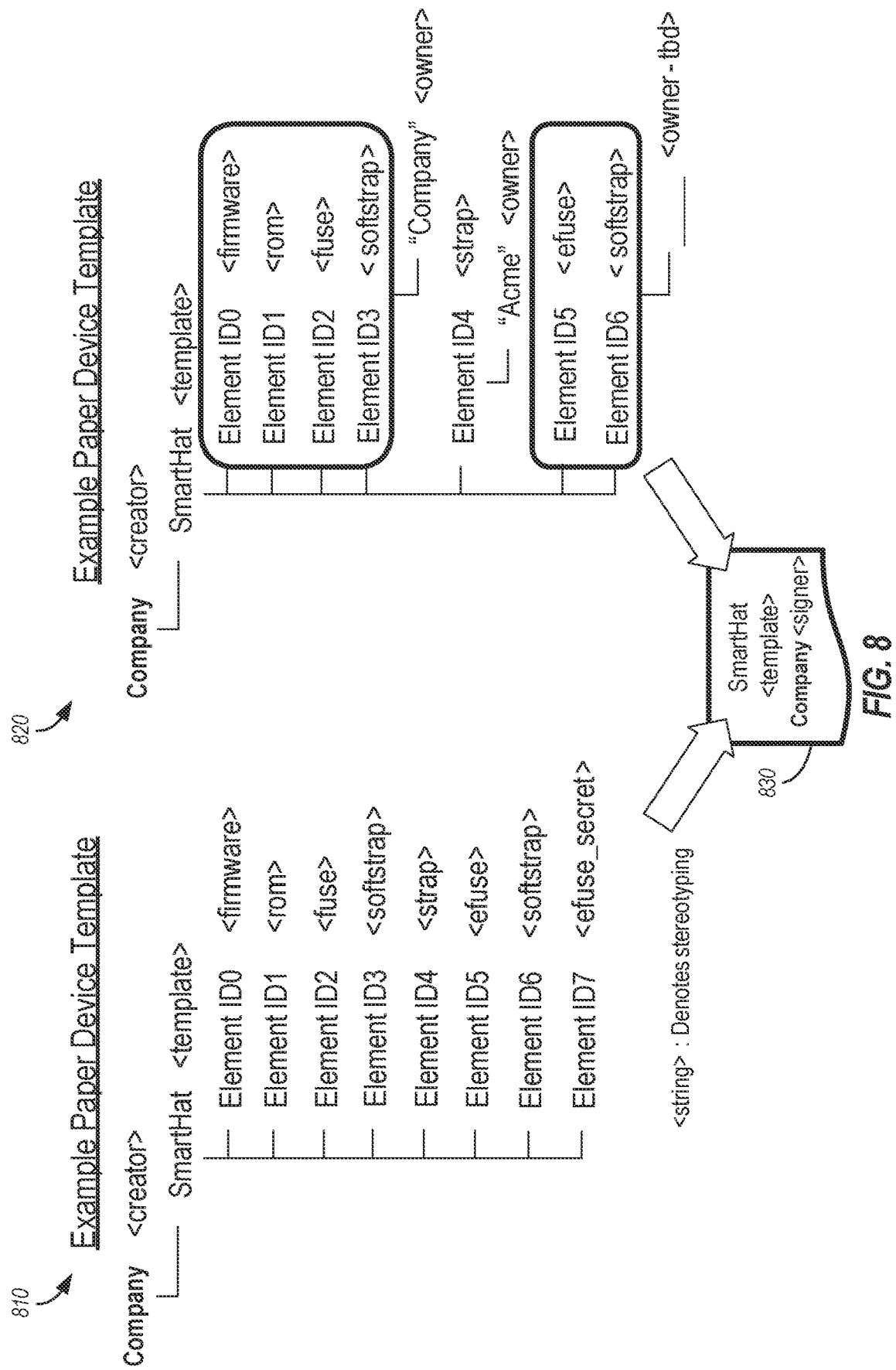
FIG. 8 illustrates a device template for attestation of a device, according to an example.

To address such concerns, FIG. 8 provides examples of a device template for attestation of an example hypothetical "paper" device. In the template 810 depicted on the left of FIG. 8, a device creator defines the template for attestation information, and the template provides values which: identifies what discrete elements exist, defines the amount of a hierarchy bushiness or sparseness, and assigns names and identifiers to disambiguate elements. Only the creator can modify the template, as the template assigns initial element owners.

Additionally, the template 810 depicted on the left of FIG. 8 provides a 'template' for a logical device that may also be realized as a signed template manifest structure 830. The template manifest structure 830 contains a hierarchy of elements, and some are structural in that they name or identify a branching structure used to logically represent a device composition. Elements may be given a locally or globally unique identifier such that the element can be distinguished from some other element in the template. Furthermore, each element may have stereotyping that places the element into a class of discrete components which may have certain security properties and behaviors. A supply chain entity may assert these properties or behaviors as intrinsic claims about the discrete component according to the stereotyping. For example, a <fuse> stereotyped value may be implemented using a PUF (physically unclonable fuse) technology that resists tampering. The vendor/owner entity that supplies reference values for the element may include intrinsic claims based on the device's actual construction in addition to claims that describe a reference value (as described above).

With reference to the template composition 820 depicted on the right of FIG. 8, element owners supply reference values. The creator may assign owners at time of template creation, and ownership may be asserted later if unassigned by template. Elements are not required to have an owner; for example, an attester can supply a measurement that does not have a corresponding reference value. However, a creator creates a template manifest. Additionally, the template 820 depicted on the right of FIG. 8 provides an example device template (and manifest/tag) for the structure 830 where a set of logical elements are owned. The owner may be assigned or implied by the template creator as part of template creation, or another owner may be assigned. Additionally, measurements/claims may by default be owned by the attestation evidence creator (a.k.a., device manufacturer). Furthermore, module elements may not be assigned at template creation time, but may be assigned later, or not at all.

An unassigned owner may be assigned later using a voucher (e.g., as defined in IETF RFC 8366) where the voucher specifies the template (manifest/tag/module) and measured fields with the assigned/intended owner. The owner may use the voucher to prove to a challenger/verifier that the supply chain entity named in the voucher is authentic. It may be desirable for measurements of an element that has intrinsically secure properties, such as a fuse that once blown cannot be re-blown, to be contained in a manifest/tag. The entity that has physical possession of the device or otherwise is able to blow the fuse may be viewed as the owner for the purposes of designating an owner entity. Other ownership assignment techniques may be possible as well.

Figure 9:
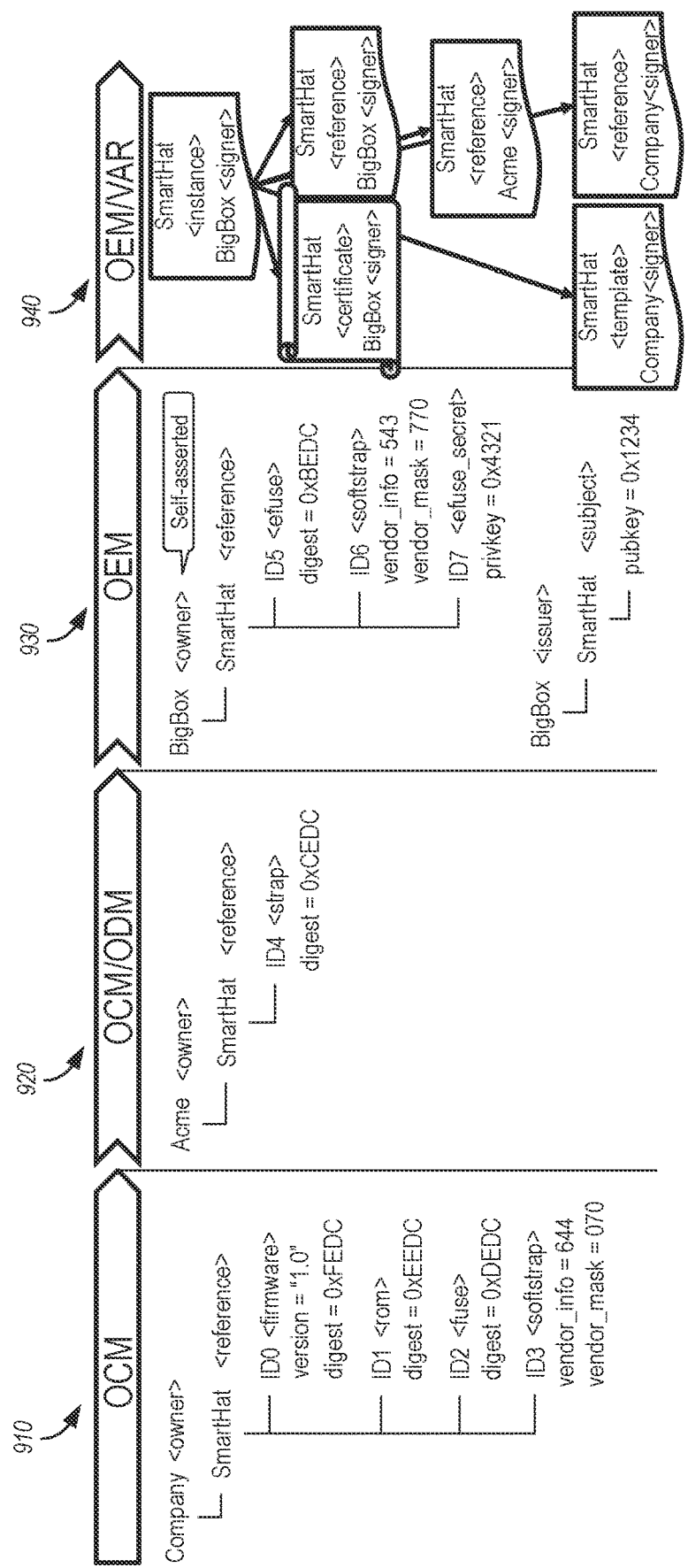
FIG. 9 illustrates reference value assignment for use with attestation information, according to an example.

FIG. 9 provides an example of reference measurements assignment where values may be assigned at different points in a supply chain process (e.g., at the original component manufacturer 910, original device manufacturer 920, original equipment manufacturer 930, or reseller 940). In the context of FIG. 9, an example supply chain process may involve multiple cooperating suppliers that supply reference values (aka reference manifests) according to the ownership assignment methods described above. For each device element (as defined by the template manifest) the rightful owner is unambiguous and therefore, one supplier cannot remove or replace a value supplied by a different supplier.

The "OEM/VAR" portion of FIG. 9 (e.g., corresponding to the reseller 940) shows a 'class' manifest that bundles or pools the template and various reference manifests together to form a fully specified logical device 'endorsement'. Thus, the entity that issues the 'class' manifest asserts that the suppliers of the various other manifests are the expected and intended suppliers of reference and template structure for a given logical device description. There need be only one instance of a 'class' manifest as it is common across all device instances that are described by the pool or bundle of manifests.

The "OEM" portion of FIG. 9 (e.g., corresponding to the original equipment manufacturer 930) shows a supply chain interaction where a supplier (e.g. BigBox) creates device identity credentials for each device instance it manufactures (as depicted by the SmartHat <certificate> structure). An 'instance' manifest may be issued for each identity instance supported by the device. In a multi-component device there may be multiple RoT each having a distinguishable device identity credential. Therefore, the 'instance' manifest may link to multiple device certificates (also known as 'manufacturer certificates'). The 'instance' manifest may also link to or reference the 'class' manifest as a way of describing the type of device.

Each certificate may include a reference to a 'class' manifest that describes a logical composition of a device; to which the certificate applies. For example, if a composite device consists of four roots of trust, each root of trust having a separate certificate and 'class' manifest. A lead or primary root of trust may represent fully (or partially) the other roots of trust as being elements of the same composite device. Therefore, the lead root of trust may have a 'class' manifest/tag that references the 'class' manifests/tags that describe the remaining modules/sub-components/roots of trust, etc. . . . .

In a particular case where an element (e.g. ID7) is designated as a resource that is used to store and protect secrets, the template manifest/tag may include a branch with stereotyped entry that may not include a reference measurement of the private key (e.g. "privkey=0x4321"), but it is understood that the logical resource exists and claims may be supplied such as a fuse-id, <efuse_secret>, or as a child module of the ID7 element.

Figure 10:
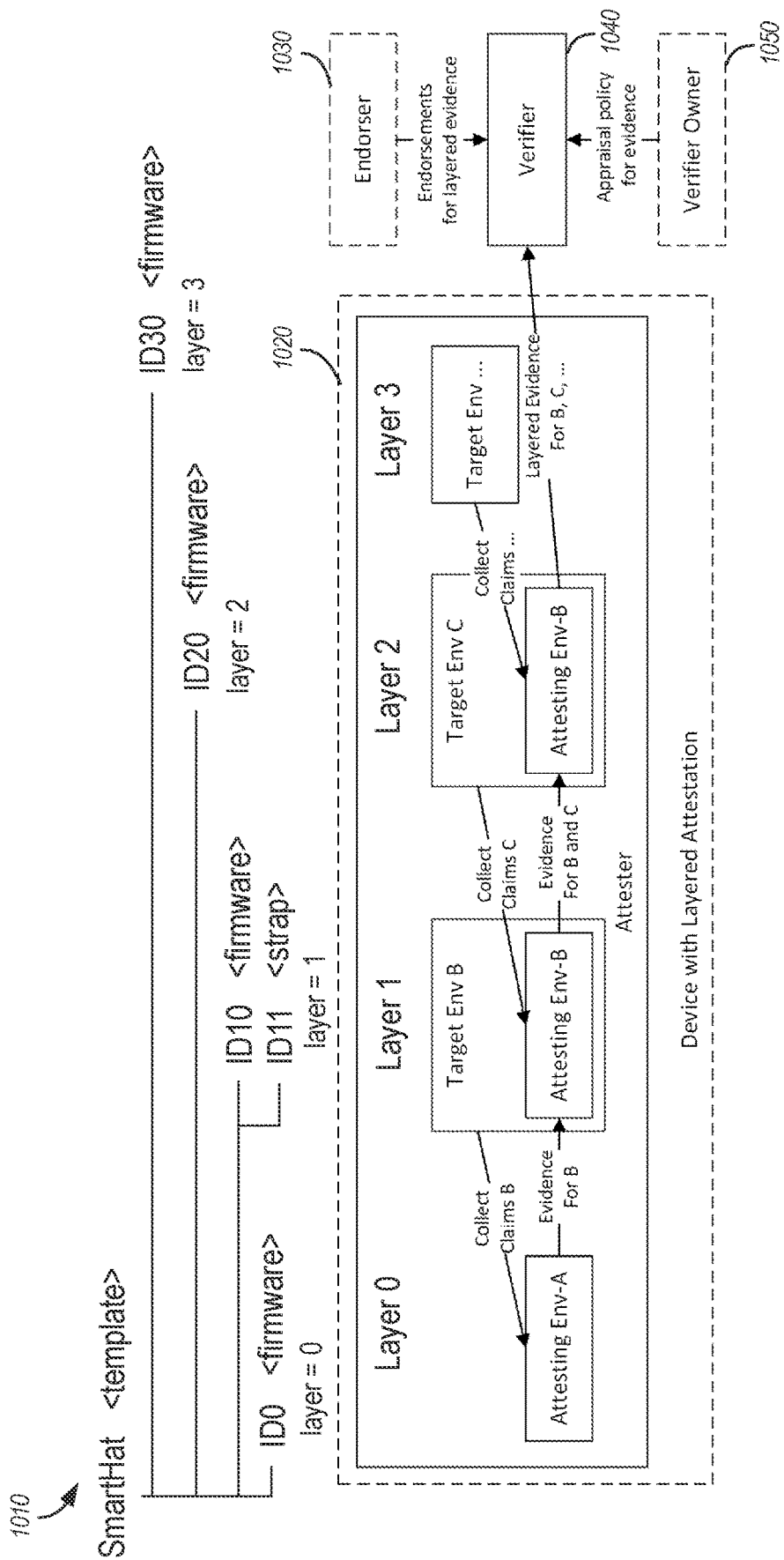
FIG. 10 illustrates use of a template for attestation information to inform device patterns, according to an example.
Figure 11:
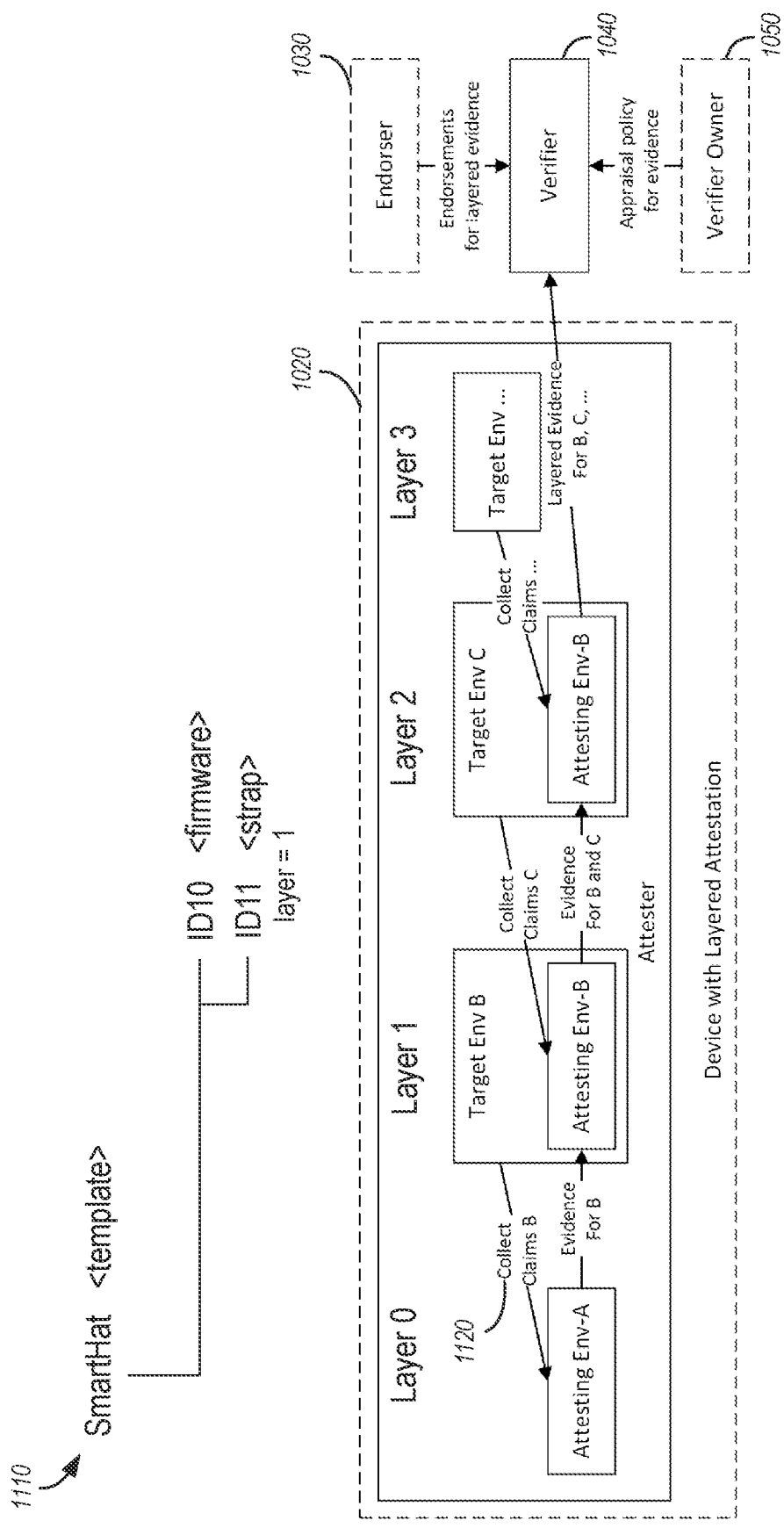
FIG. 11 illustrates use of a template manifest for attestation claims collection, according to an example.

FIG. 10 provides an example of how a template for attestation information may be used to inform device patterns. In an example, a layered device pattern may expect firmware or other modules per layer; the "layer" attestation claims can be specified in the template. FIG. 11 also illustrates how a template informs claim collection about the layering structure and/or informs the verifier regarding layering structure. The attesting Env-A may use the template to understand which claims to collect and/or a verifier may use the template as instantiated by a manifest/tag composition to understand which claims to compare to evidence.

Specifically, in FIG. 10, a manifest 1010 is shown that includes device layering, such as where an expected layered device 1020 may include components among four hardware layers (Layer 0-Layer 3). These layers may be required to include various elements, in order to provide attestation evidence. The attestation evidence is linked in the form of layered evidence for the multiple hardware layers, and provided to a verifier 1040. The verifier 1040 verifies the attestation evidence based on endorsements for the layered evidence from an endorser 1030 and an appraisal policy for evidence from a verifier owner 1050. For example, the diagram of FIG. 10 shows every hardware layer having a <firmware> element and layer 1 having an additional <strap> element. The template manifest with layer instrumentation may be used to qualify or segment firmware according to a layer designation. Firmware designed for layer 2 may not be used with a layer 1 or layer 0 element. This ensures greater design and operational integrity/resiliency in a supply chain.

FIG. 11 illustrates use of a template manifest 1110 for an example attestation claims collection. In FIG. 11, a template manifest 1110 is shown to inform or instruct attestation claims collection in the device 1020. Here, an attesting environment claims collection algorithm (e.g., implemented with collection logic 1120) in the device 1020 may be programmed to require collection of specific expected layer 1 elements ID10 and ID11. Additionally, an attestation claims collection algorithm might accept a template as input where the existence of ID10 and ID11 in the logical device map directs the collection logic 1120 to obtain a measurement of firmware and the strap value as a minimum expected claim set to be included with attestation evidence. Alternatively, a claims collection designer may be informed by a template to design a claims collection algorithm. This, in connection with a manifest/tag containing a composition that also has been informed by the template, ensures that the attestation verifier 1040 is guaranteed to match and accept the proper claims for trustworthiness appraisals.

Figure 12:
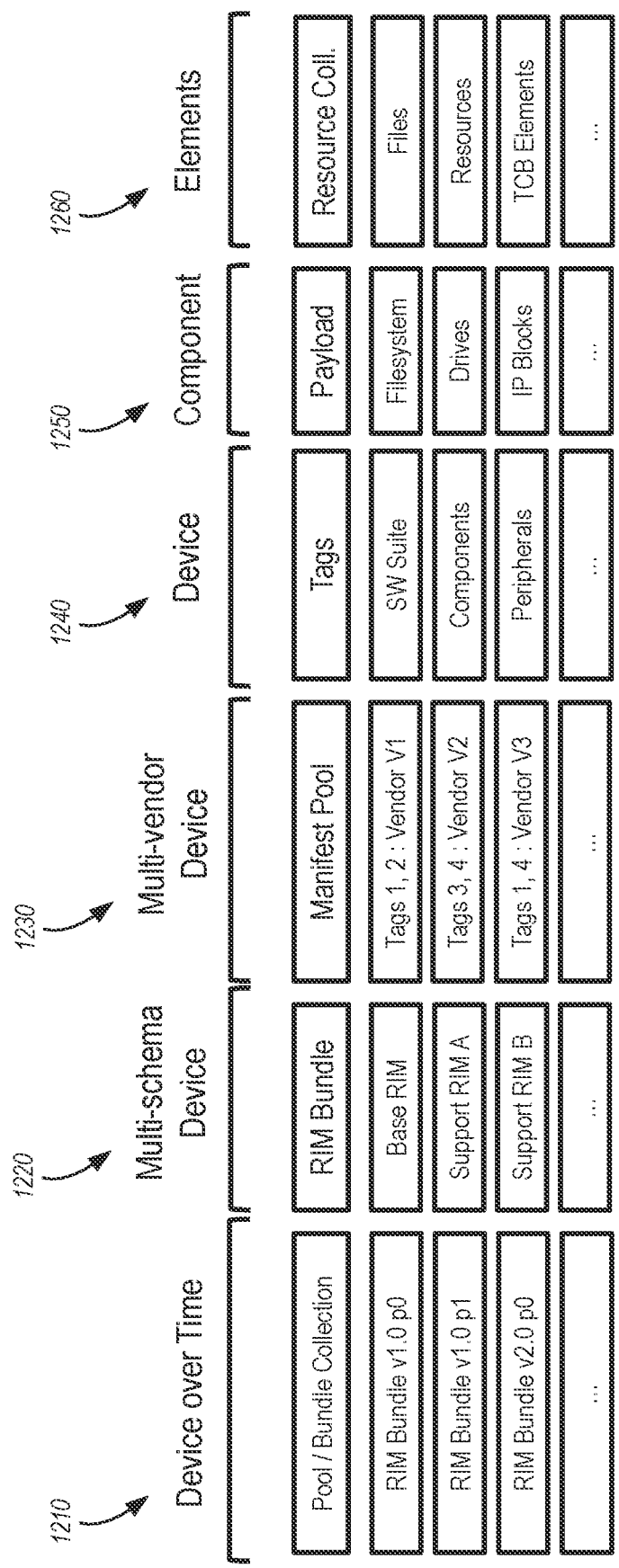
FIG. 12 illustrates use of endorsement to describe device state changes, according to an example.
Figure 13:
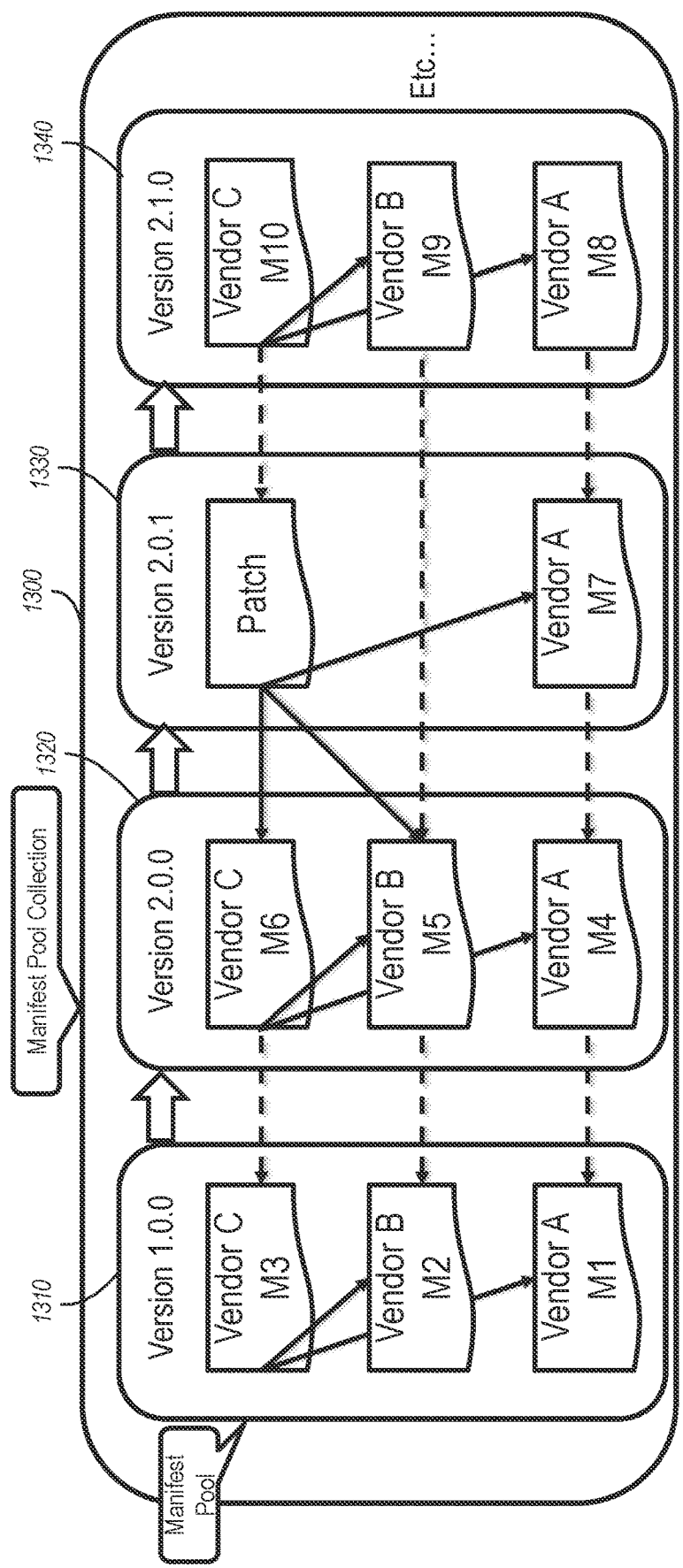
FIG. 13 illustrates use of device update semantics in a manifest pool, according to an example.

FIG. 12 illustrates use of endorsement to describe device state changes, and FIG. 13 illustrates use of device update semantics in a manifest/tag pool. For instance, FIG. 12 depicts how endorsement can describe device state changes over a period of time, as a device state 1210 transitions from a 1.0 first version, to a 1.0 first version with a patch, to a 2.0 second version. This may occur even as different elements and components of a device may change. The endorsement may also be tied to multi-schema device properties 1220, multi-vendor device properties 1230, device properties 1240, component properties 1250, and element properties 1260.

Likewise, in the scenario depicted in FIG. 13, device update semantics may be provided to allow different device components and versions to be tracked within a manifest pool. Here, a manifest pool collection 1300 includes multiple manifest pools 1310, 1320, 1330, 1340 which transition among different versions, even as properties and components from multiple vendors are involved.

In an example, a software identification (SWID) tag/ concise SWID (CoSWID) tag schema, such as that invoked by an IETF standard, may be relevant to the attestation approaches discussed herein. Here, one or more schema(s) may be defined using or incorporating SWID or CoSWID to capture metadata for the construction and parsing of reference and/or endorsement manifests/tags (and, as the CoSWID schema defines a Resource-collection). In a SWID or CoSWID or other tag schema applicable to TCB trustworthiness properties, such as a Resource-Collection or other construct that defines a hierarchy of modules and/or claims, and the TCG DICE Tcb-info as a claim set for attester evidence. A resource-collection or other hierarchy is part of the tag schema that describes, for example, the software packages, update and patch semantics or the static or dynamic interactions of modules and sub-modules of a hardware device.

Figure 14:
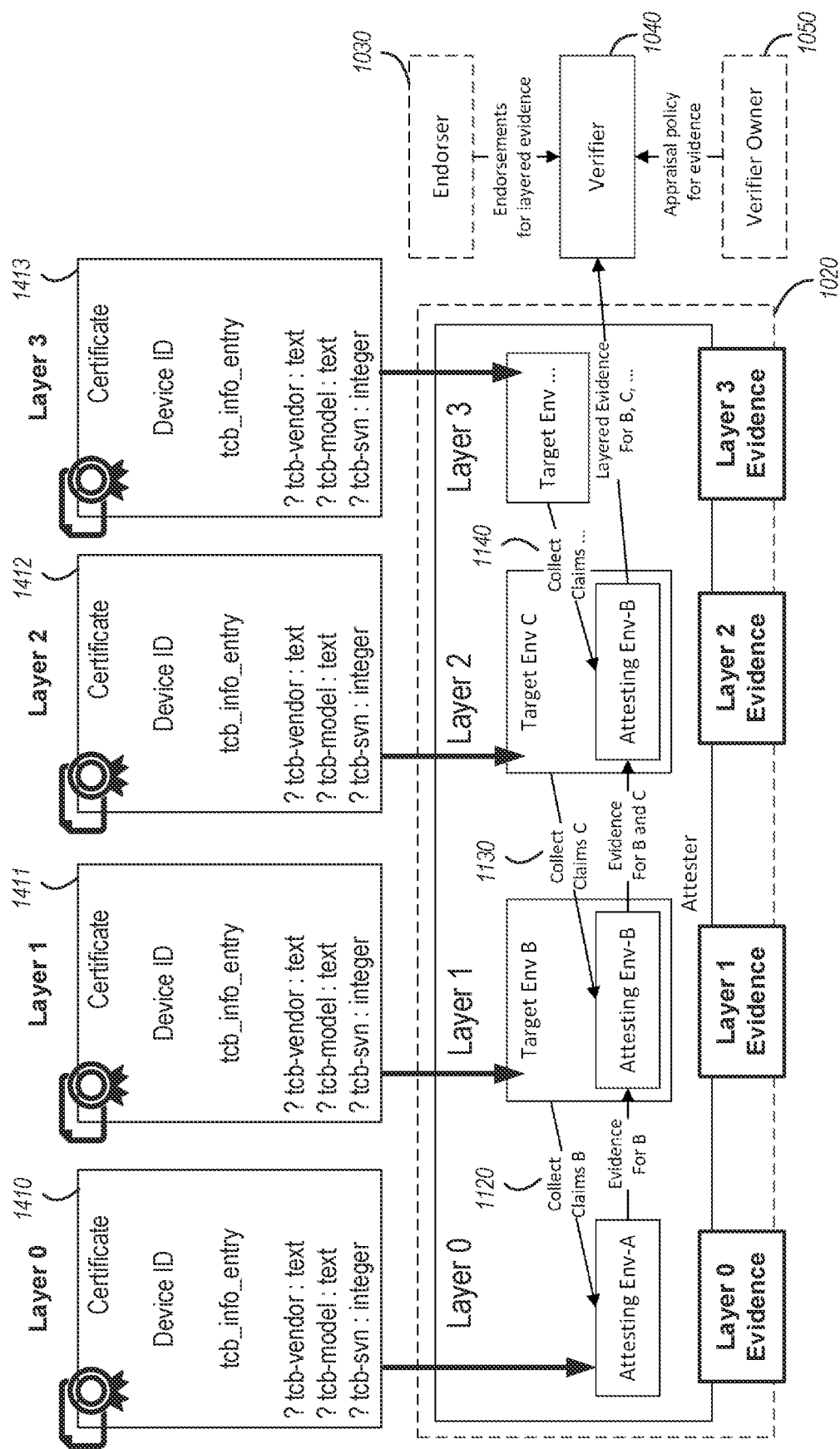
FIG. 14 illustrates examples of attestation claims evidence and collection, according to an example.

FIG. 14 provides additional examples of how claims collection and evidence generation may be established using a TCG DICE Tcb-info structure, with a TCB schema. Here, the measurements established among multiple layers 1410, 1411, 1412, 1413, allows collection of claims with collection logic 1120, 1130, 1140, and verification as discussed above with reference to FIG. 11.

Figure 15:
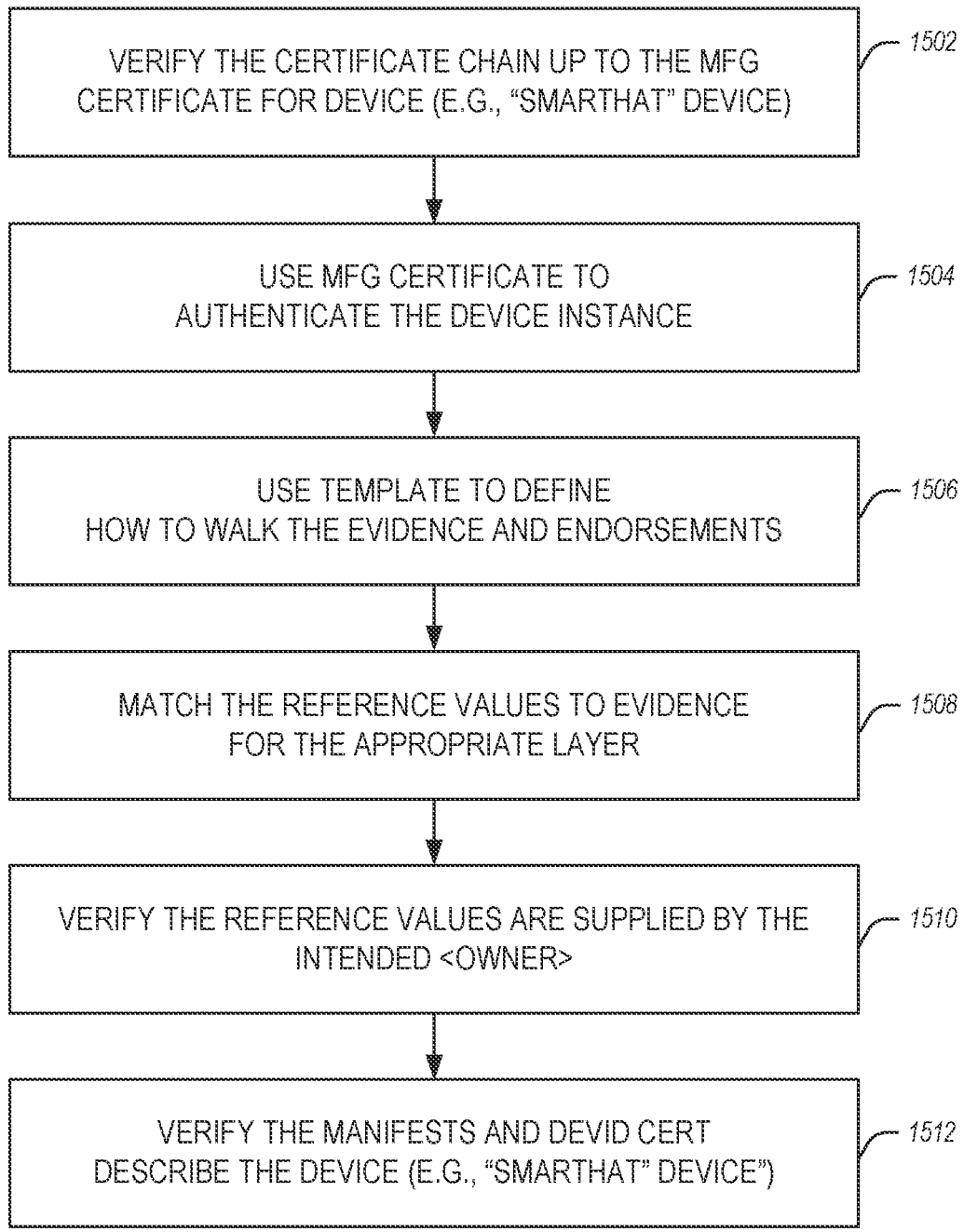
FIG. 15 illustrates a flowchart of a verification process using attestation claims evidence and collection, according to an example.

Likewise, the flowchart of FIG. 15 illustrates the use of structures that may be described as attestation 'endorsements', 'claims' or 'evidence' in an attestation workflow involving a supply chain and operational deployment such as in an edge computing environment, cloud or IT data center. For instance, as depicted in the flowchart of FIG. 15, a verification process may include: verifying the certificate chain up to the mfg cert for the device (operation 1502); Use mfg certificate to authenticate the device instance (operation 1504); Use template to define how to walk both the evidence and the endorsements (where endorsements may include reference measurements, endorsed measurements, device identities, device keys, and compositional logic), (operation 1506); Match the reference values to evidence for the appropriate layer (operation 1508); Verify the reference measurements are supplied by the intended <owner> (operation 1510); and Verify the manifests and device identity (e.g., IEEE IDevID certificate) that describes the SmartHat device (1512).

In summary, a <Template> composition of a manifest/tag creates a device model for representing attestable hardware elements, while a <Reference> composition of manifest/tag contain reference measurements in the context of the device composition model. Claims collection, that is informed by the device composition model, ensures the evidence is relatable to the Endorsements. A commonly accepted/adopted composition schema is helpful when describing compositional metadata that gives semantic meaning to the various syntaxes for manifests and evidence encodings. Inclusion of semantic metadata with manifest/tag ensures that a simple "paper" device may be attestable by generalized verifiers. It also facilitates generational device changes and updates through minting of new manifests/tags that describe the updated hardware/firmware/software.

Accordingly, the preceding approaches enable attestation verifier duties and appraisals to be made simpler, more robust, and more secure by the use of a manifest/tag that has compositional statements. This manifest helps in the construction of reference manifests, class manifests, instance manifests, device ID credentials, attestation claims collection and evidence creation.

Additional examples of the processing algorithms and schemas used for establishing attestation are provided in the remaining drawings. These are relevant to: an Endorser (to Map Device to schema with reference and static claims); an Attester (to Walk Device to collect actual claims); to a Verifier (to Walk Endorsements and Evidence and compare values).

As noted above, various forms of manifest/tag structures such as SWID and CoSWID may be used to define attestable platform/device compositions and their trustworthiness properties. It will be understood that other schemas for hardware or TCB identification and their trustworthiness properties may also be applicable. For instance, a composition schema may be used to define how module endorsements relate to the modules expected operational state; and how a device module may be decomposed into a set of sub-modules. Such patterns may be relevant to: a canonical set of device patterns including: Composite Device w/Sub-Attesters; a Composite Device w/Sub-Target Environments; a Composite Device w/Peripherals (non-Attesters); a Layered Device; or a Hybrid Device (which may be a combination of aspects taken from the canonical set of device patterns).

Device Endorsement Manifests

Figure 16:
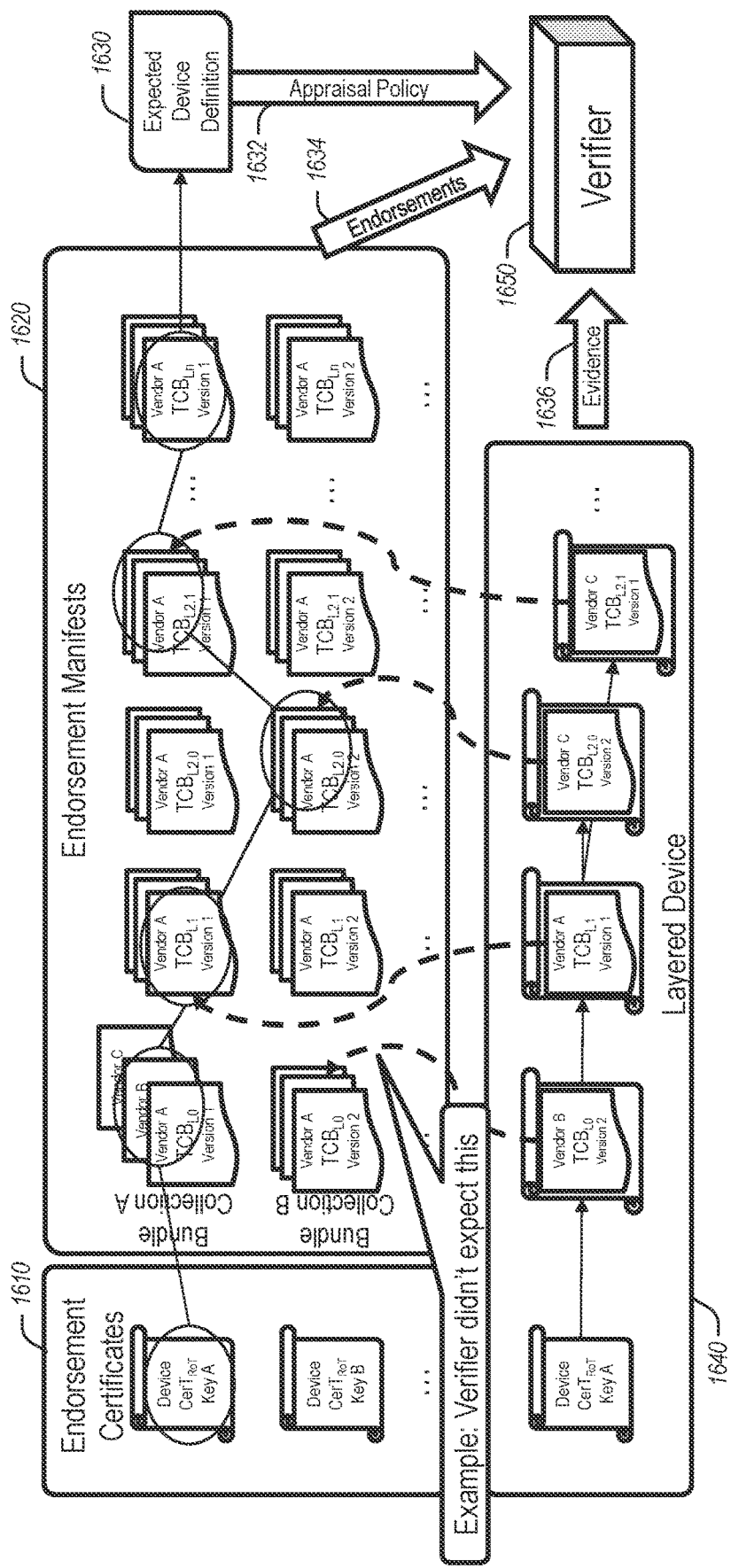
FIG. 16 illustrates relationships of attestation data and operations to endorsement manifests, according to an example.

FIG. 16 illustrates an example of compositional relationships between a set of endorsement manifests/tags/credentials. Here, endorsement certificates 1610 indicate the validity of manifest 1620, to produce an expected device definition 1630. This device definition 1630 is evaluated by a verifier 1650, according to an appraisal policy 1632 (produced from the expected device definition 1630) and endorsements 1634. Then, when a layered device 1640 provides evidence 1636 to the verifier 1650, the verifier can verify the evidence 1636 using the endorsements 1634 to accept or reject measurements where accepted measurements are available for consideration by the appraisal policy 1632.

A non-limiting example of the schemas that may be used with these endorsement manifests/tags that includes: ISO SWID Tags; IETF CoSWIDs; TCG Platform Certificates; TCG Endorsement Certificates; TCG DICE Certificates/TCB Info Extensions; a TCG Base RIM; a TCG CEL RIM (Support RIM); a TCG TPM RIM (Support RIM); and a TCG Firmware Integrity Manifest (FIM); TCG and IETF CORIM (concise reference integrity manifest) which may include concise module ID tags (CoMID) and/or CoSWID tags).

In an example, a Device Endorsement Manifest defines a schema consisting of several map structures that are an analog representation of a computing device or component. SWID is a schema designed for software asset management. CoSWID is backward compatible with the SWID schema that is adapted to support hardware devices and components.

CoSWID has several structures that support device attestation. In an example, Endorsers assert endorsed Claims by signing tags (concise-swid-tag). A signature block (signed-coswid) contains the Endorser's digital signature and other information about the Endorser using the entity-entry map. A validity period, validity-entry, allows the manifest to expire if needed and restricts when the manifest is available for use.

CoSWID may be used for software asset management, it may map measurement names that imply software contexts. SWID may be used to describe hardware and/or firmware given there is a mapping of the hardware composition hierarchy to the SWID filesystem hierarchy. The device name, version and other descriptive attributes may be contained in the concise-swid-tag and software-meta-entry maps. Device patterns and reference measurements may be contained in the payload-entry map. The resource-collection and object-entry maps may be used to construct a hierarchical acyclic graph that describes device patterns and device decomposition structure. This is referred to herein as a device schema.

Alternatively, a device schema may be implemented using a description logic that is specific to hardware compositions and device patterns. For example, the TCG and IETF CoMID tag contains a list of compositional statements that map a module (e.g., device, component, sub-component, environment, element/discrete structure) to a set of measurements (a.k.a., claims) or a module to another module. Alternatively, device composition can be represented by IETF Entity Attestation Token (EAT) that defines a nesting of signed or unsigned tokens that may approximate a hierarchical decomposition of a device.

The CoSWID or other device schema may include a device, device sub-components and other elemental structures that are a further decomposition etc. Modules in the decomposition have attestation measurements that may be used as reference claims (which are matched to evidence claims) or endorsed claims that augment accepted (i.e., matching) claims. Here, modules or elements can refer to anything that has measurements (i.e., has a digest, property, or raw value). A manifest may have multiple tags, as each tag consists of compositions that describe modules and their measurements. Multiple manifests/tags could be used to describe a single device. Different suppliers may define the various modules of different devices or they may define various modules of the same device. If multiple suppliers define modules of the same device, they agree to use a common device model/device pattern that may be agreed upon externally to the manifest/tag or may be encoded in a manifest/tag using a field that names the device model (e.g., concise-swid-tag software-name, comid-tag module-name). Each supplier may issue (i.e., sign) different manifests, but the combination of tags in each manifest may describe the device composition.

Verifiers are made aware of multiple manifests by including a reference (e.g., URT) to other manifests that may contain related tags. Additionally, evidence structures may provide a reference to relevant manifests/tags to facilitate verifier discovery of manifests/tags.

Manifests/tags (e.g., CoSWID, CoMID) have tag identifiers that may be used to reference other related tags. Related tags may designate the particular type of relationship that exists between tags, such as whether the tag replaces, updates, supplements, patches, includes or otherwise describes the conditions whereby the tag contents are processed; either to support tag lifecycle, device/module lifecycle or device/module composition. Endorsers may work with multiple suppliers to 'second source' similar components. For example, the entity-entry of a concise-swid-tag can be used to identify alternative suppliers of a module.

A tag may have one or more statements (e.g., CoSWID payload-entry) containing compositional logic such as a CoSWID resource-collection structure. Compositional logic can be used to construct a hierarchy of objects or modules and may describe which measurements/claims are associated. Statements may contain static claims, (measurements that describe properties of the module that are fixed at manufacturing time or relate to quality or compliance tests).

In various examples, a manifest/tag composition structure may specify hardware modules that nest within other hardware modules or interact with other hardware modules over a bus or other communications channel. Additionally, compositions may describe a firmware module that runs on a hardware module or software that runs on a collection of hardware modules. It may describe programmable hardware design modules that are loaded into a programmable hardware array. It may describe configuration data that are provisioned into a hardware, firmware, or software module, etc. It will be understood that this and other schemas may be adapted to express other module relationships and linkages.

Supplying endorsement measurements/claims may be provided as follows: Supply chain entities working to define a common device template organically construct modules that can be incorporated into a composition structure in a tag structure.

A composition statement may relate a module to measurements. Modules may be described by a set of attributes that identifies a manufacturer, model, and/or module class identifier. Additionally, a relative position of the module to other modules may be specified using a layer and/or index coordinate. The layer and index coordinates may also describe trust dependency such as described by the layered device pattern 1020. A module may have a human readable label for human-computer interface support.

Measurement (a.k.a., claim) statements appear in both evidence and in reference values of a reference manifest/tag. The Verifier identifies the set of accepted measurements by matching the measurements found in evidence with measurements found in reference manifests/tags. If the evidence module matches the reference module (i.e., each attribute of the module identifier) matches and the evidence measurements matches the reference. Then the measurements are accepted by the Verifier. Appraisal policy for evidence is evaluated using the accepted measurements.

The following measurement types may be used to assess the trustworthiness of a hardware or firmware module:

The version and svn fields determines if attested module contains the expected version or security version number (svn).

The flags field describes manufacturing default and operational states. If the state is fixed at manufacturing time, the flags value could be supplied to the verifier via an endorsement manifest/tag rather than via attester evidence. If the state is a state that the device could enter during the course of its deployment, evidence supplies the current value that the verifier compares with reference values. If a bit in the flags measurement is omitted from an endorsement measurement, then the device is not expected to be able to enter the state during deployment. Evidence to the contrary may signify a compromise.

The digests field consists of a digest value and hash algorithm identifier. Multiple digests entries are used for algorithm agility.

The raw-value measurement field is used to report measurements in the clear (not obfuscated by a digest). Reference manifests/tags may include a bit mask value that instructs verifiers which bits in a raw-value measurement to ignore.

Endorsement (and reference) manifests are digitally signed. A signed manifest may be understood to mean that the signer asserts the composition statements in the tag/manifest are valid for use by verifiers. The signature may also assert the tag attributes are valid. The signature further asserts that the manifest is valid.

The manifest issue may de-assert validity of the manifest (and therefore de-assert validity of the tag and its composition statements) by creating a manifest revocation list. The manifest identifier is placed on the manifest revocation list which informs the verifier to disregard the matching manifest.

The manifest may contain a validity-entry that defines when the manifest is available for use. The not-before field may be the time when the manifest is available for use and the not-after field may be the time when the manifest is no longer available for use. If the validity-entry is omitted, the manifest may be immediately available. Manifests may contain links to other attestation related information such as other manifests, certificates, policies, or the like. Verifiers may use references as hints to discover attestation verification related information.

Multi-Supplier Manifests

Multi-component devices with endorsement manifests may be enabled with the attestation techniques discussed herein. A device might consist of several components and sub-components (a.k.a., modules). Various modules might originate from different suppliers. Each supplier (a.k.a., Endorser) might independently produce manifests with measurements that pertaining to the same module. For example, a device supplier composes a device by integrating various suppliers' components. The composer of a multi-component device constructs a manifest that references the various suppliers' manifests this is known as a multi-supplier manifest. A multi-supplier/multi-module manifest may consist of multiple tags and multiple composition statements about the various modules produces by the various suppliers. A multi-supplier manifest is also a multi-component/multi-module manifest.

The manifest composer can construct a multi-component manifest by copying values from the various component manifests into a new manifest signed only by the composer. Verifiers of this manifest are not expected to obtain trust anchors to verify the suppliers' manifests as these are omitted by the top level supplier who replaces suppliers' compositions and measurements with his own.

Subsequent updates to suppliers' modules may result in re-issuance of the top-level multi-component manifest to reflect the update. Verifiers may trust the top-level composer to correctly construct the updated multi-component/multi-module manifest.

In a further example of a manifest containing a CoSWID tag link-entry map may be used to create URI references to the component manifests in a multi-supplier manifest. For each component, a link-entry.href URI may be constructed that refers to its manifest. The relationship rel value must be 'component' or 'feature'. The feature relationship is used when access to the component can be operationally disabled. The absence of the feature under normal operating conditions would not signal behavior that is out of the ordinary.

A digest (i.e., CoSWID tag link-entry map may contain a thumbprint) of the referenced manifest should be included to allow an integrity check of the referenced manifest. The concise-swid-tag identified by tag-id contains the data that is hashed to produce the link-entry.thumbprint digest.

If available at the time the component manifest is signed, the parent multi-component device manifest may be referenced using the link-entry.href containing a URI to the multi-component manifest. The rel map must contain the value 'parent'. (As indicated by the dashed lines in FIG. 17 or 18, discussed below). Reverse references can aid Verifiers in the construction of a model of the multi-component device. However, supply chain dynamics may make use of revers references impractical due to staging and other dependencies.

Attesters should provide a reference to the top-level manifest that a Verifier uses to construct a complete model of the multi-component device. For example, the tcg-dice-endorsement-manifest-uri identifies an X.509v3 certificate extension that contains a URI reference to a device manifest.

A component or sub-component supplier might update the component after the device manifest is created. The device supplier might not re-issue the device manifest with links to the updated multi-supplier manifest(s). Nevertheless, the correct device model can be constructed by a Verifier if the component supplier includes a link-entry.href URI to the previous component manifest in the updated component manifest. The link relationship rel value must be 'ancestor'. The verifier is able to match the tag-id values of the ancestor manifest with the original component referenced by the device manifest.

Figure 17:
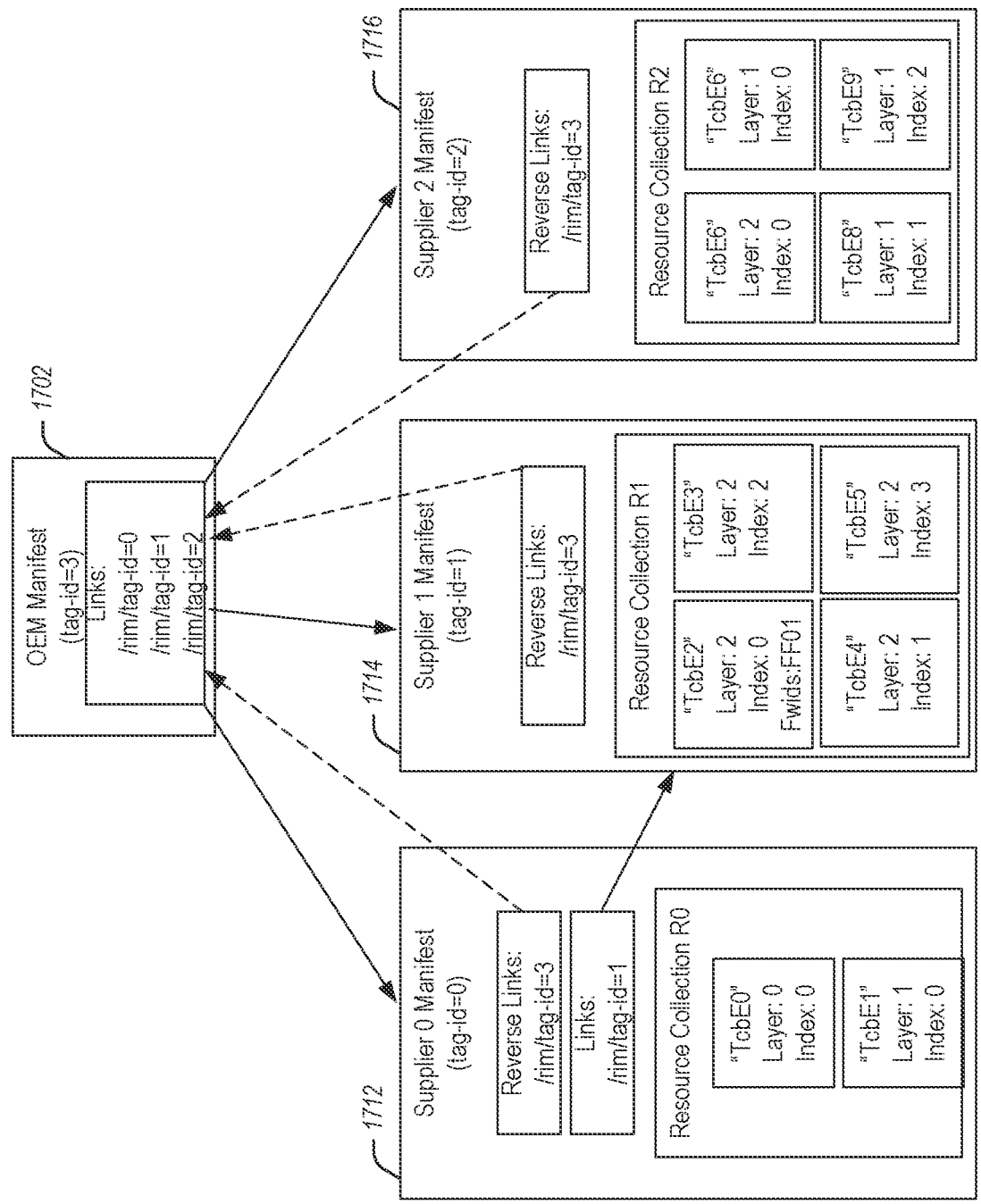
FIGS. 17 and 18 illustrates examples of a multi-Component Device Endorsement model based on multiple Endorsement Manifests, according to an example.
Figure 18:
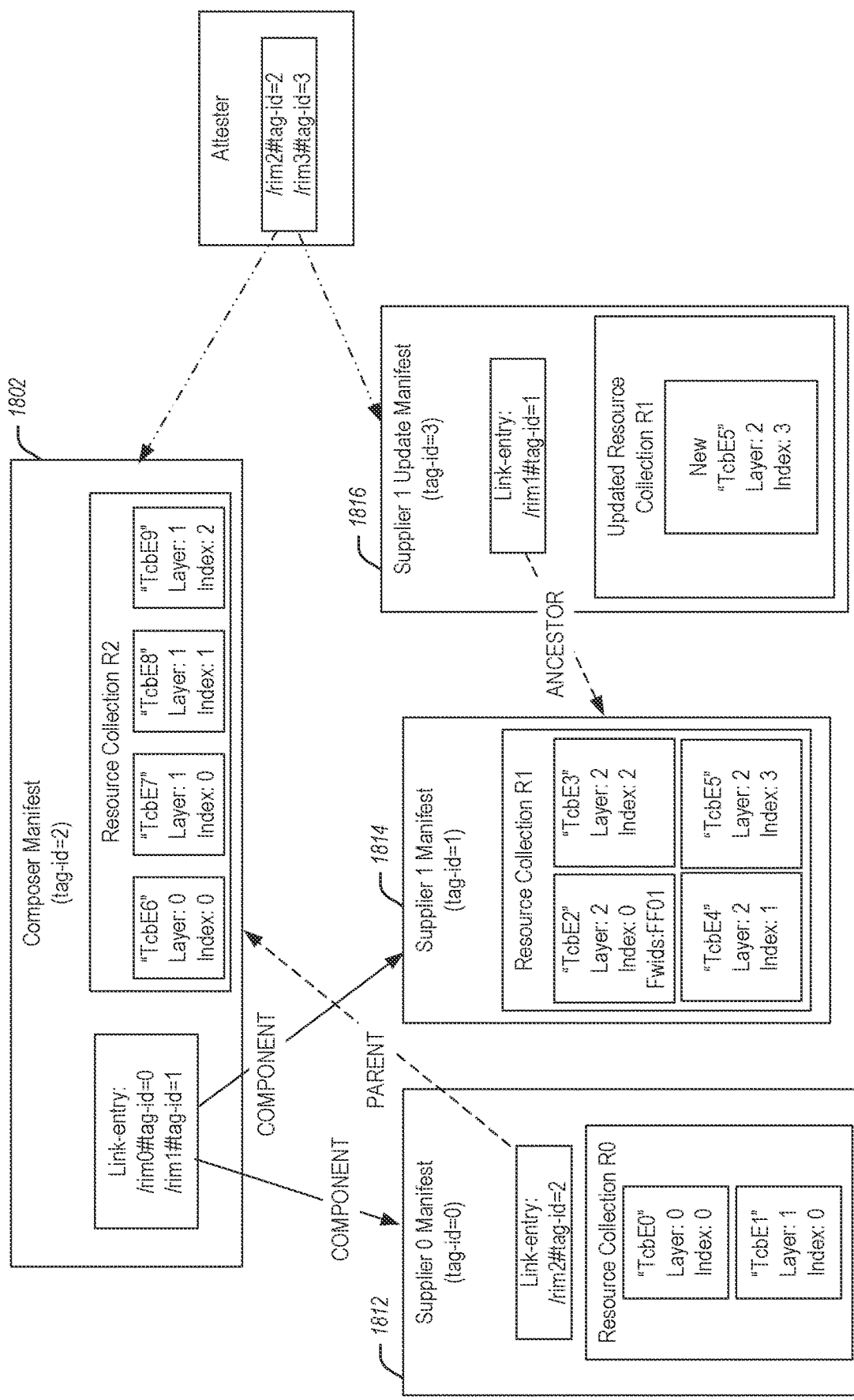

FIGS. 17 and 18 demonstrate examples of a multi-component manifests, using the preceding techniques. It will be understood that additional relationships and data values may also be provided.

For instance, an example multi-component device may have a multi-supplier manifest (as arranged in FIG. 17 or 18), with three component manifests each issued by different suppliers. For instance, in FIG. 17, OEM manifest 1702 is linked to manifests 1712, 1714, 1716; in FIG. 18, composer manifest 1802 is linked to manifests 1812 and 1814, and a supplier update manifest 1816.

In these examples, there are two roots-of-trust TcbE0 and TcbE6. Additionally, Supplier 0 and Supplier 1 collaborate (e.g., among manifests 1712, 1714) to define a sub-component consisting of six TCB Elements (TcbE0-TcbE5). The second root-of-trust consists of four TCB Elements (TcbE6-TcbE9). The resource-collection for the tag-id=0 manifest includes two of the six TCB Elements while the remaining four are in the tag-id=1 manifest. The tag-id=0 manifest includes an href link to the tag-id=1 manifest to indicate the dependency. While it may be possible to build the six TCB Element components using layer and index, it may not be reliable as other unrelated resource collections could exist that produce reasonable constructions.

Attestation Evidence Examples

In relevant attestation examples, relevant information fits in the flow from the supply chain to the verifier (the third party who is assessing trustworthiness of device), and endorsements provide some reference to verifier what they should expect to see. This is compared with evidence of the device. Thus, endorsement indicates what the verifier should see versus what the verifier actually sees.

The device patterns observe that there are typical ways in which manufacturers construct devices out of other components with attestation capability. These patterns can be composed into information models which represent fundamental concepts. Patterns represent the order and composition of the attestation procedure. Here, the patterns can be used to assess the trustworthiness of a device: the attestation technique does or does not match this pattern.

Figure 19A:
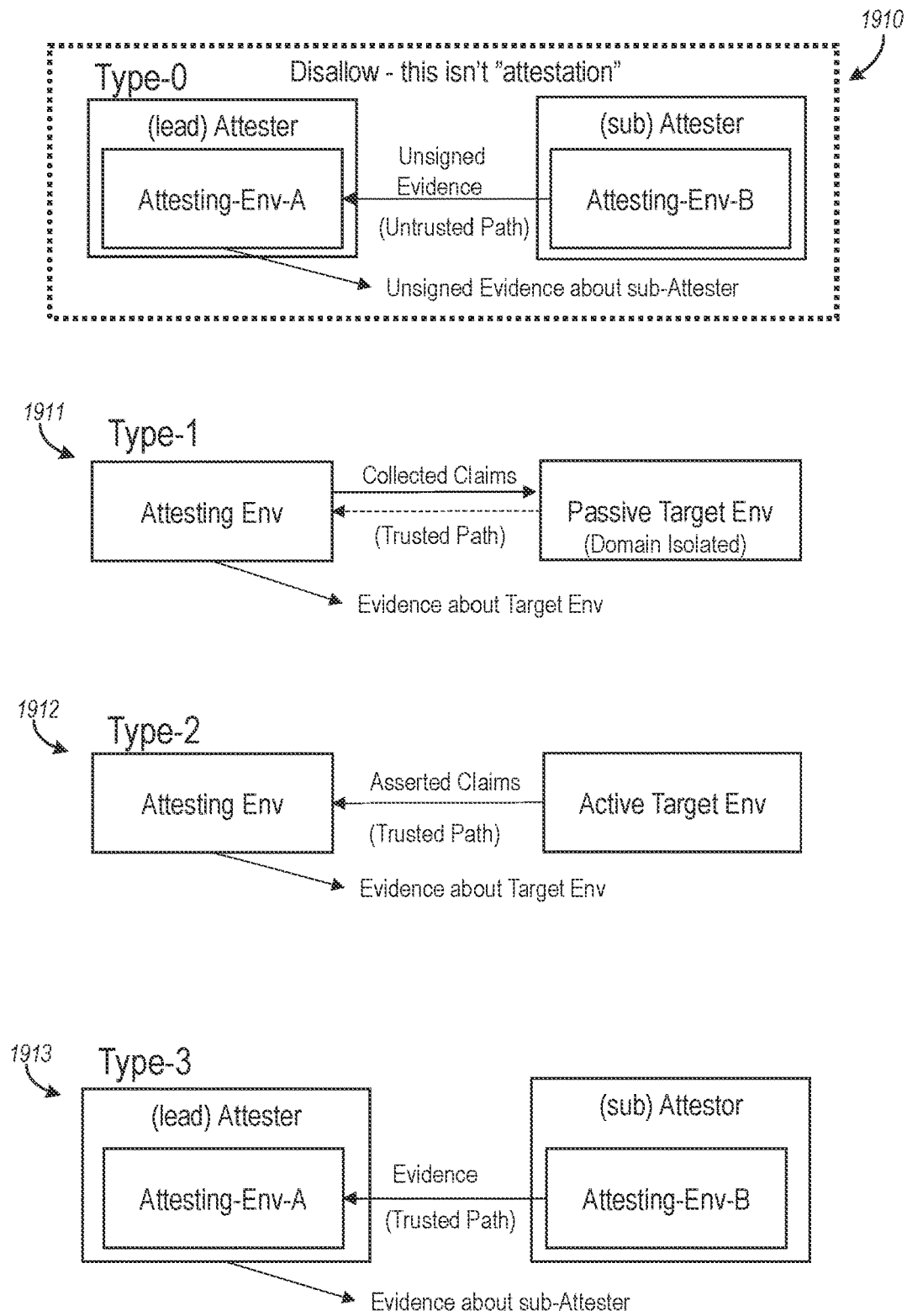
FIGS. 19A and 19B illustrates a series of attestation patterns, according to an example.
Figure 19B:
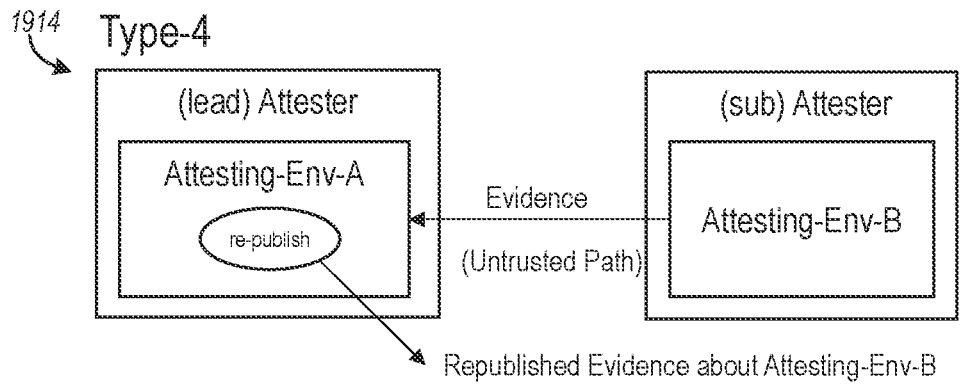
Figure 19B:
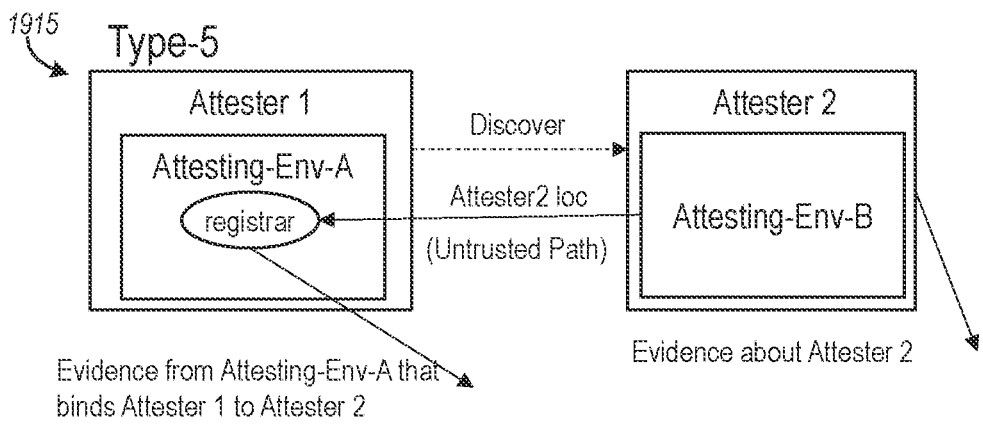
Figure 19B:
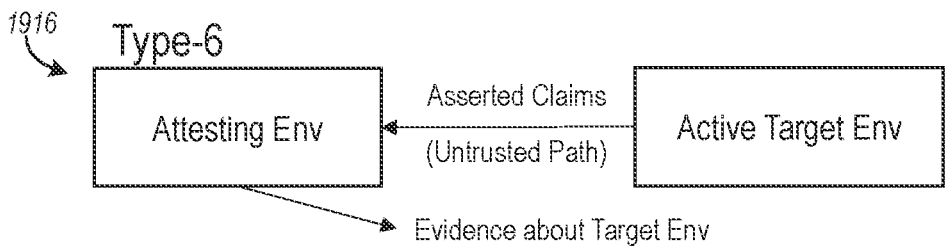

FIGS. 19A and 19B illustrates a series of attestation patterns 1911, 1912, 1913, 1914, 1915, 1916 which enable attestation, according to the techniques discussed herein. Although more complex procedures may be possible, the patterns indicate the patterns in which claims can be collected, communicated, and evidence can be reported. It will be understood from this context that environments and attesters could be from different vendors. Also, attesters have an implied attesting environment, and claims or evidence obtained via a trusted path are signed by a lead attester (but may have different signing semantics).

FIG. 19A also illustrates an attestation pattern 1910 which is disallowed from use for attestation. Here, because unsigned evidence is provided (and thus, an untrusted path is used), the attester is only able to provide unsigned evidence about the sub-Attester. Thus, information flow from an attestation pattern may be used for security purposes to ensure the expected information flows between the expected components.

In further examples, the attester device patterns (e.g., represented by the diagrams of FIGS. 19A and 19B) can be expressed as a description logic, taxonomy or ontology using a logic construct called a 'triple'. Triples may be machine-readable logic expressions. One or more triples may describe a device pattern as a composition of modules. Triples may describe the measurements/claims that belong to a module. Triples may be a form of composition statement that is expressed in a tag and by extension in a manifest.

Triples enable a machine readable description of a 'device pattern' (diagrams) that is rendered/expressed using a description logic, taxonomy or ontology or other logic construct that contains semantic information. Semantic triples may be used to not only describe the composition of an Attester device but also the flow of information (claims and evidence) within or between the components of the Attester.

In an example, Triples have three components: Subject—the component this statement is about; Object—a secondary component that is related to the Subject; Predicate—a statement that semantically relates the Subject to the Object. Triples can have conditions or properties that apply to the Subject or Object. Attestation triples describe the various interconnected components, expected measurements and flow of information. Triples can describe an unlimited set of device patterns.

In an example, CoMID claims and triples may be used for such attestation definition purposes. CoMID claims are lists of well-defined triples, and CoMID claims structure is extensible so that new well-defined triples can be added. A well-defined triple specifies the predicate semantics, the subject and object as code points defined within the CoMID grammar.

An example triple, may be defined as follows:

REFERENCE

Predicate: The subject identifies a module that has reference measurements as defined in object.
Subject: modules of type target_env or attesting_env identified by 'class-id' or 'instance-id'
Object: measurements identified by 'measurement-value' 'instance-value-group-choice, cryptographic-key, etc.

In further examples, a Verifier may use triples to compare against Evidence. For example, considering the 'tcbinfo' structure documented in the TCG DICE attestation architecture specification, there may be fields in such structure that name the module or component to which there is matching endorsements and triples. (For example, 'type', 'vendor', 'model', 'layer', 'index' fields). The concatenation of these fields is like the key to a database table that disambiguates a table of data. The verifier uses these five fields to identify the components in a device by their class identity.

Thus, consider an example where all 100,000 widgets produced on a manufacturing line have the same class identity aka the model number. 'type' is a numeric model number and 'model' is a text model name. 'instance' disambiguates a series of components that have the same 'type' but have distinct instantiations (e.g., there could be multiple USB controllers on a motherboard). 'layer' is used to describe a sequence of trust dependencies where each dependent component becomes part of the originating component's trusted computing base (TCB). A series of triples could use 'layer' to capture the expectation of a particular layering sequence (and stacking) of TCBs is expected.

Implementation Examples

Implementation of the preceding techniques may be accomplished through any number of specifications, configurations, or example deployments of hardware and software. Non-limiting examples include implementation in a chipset or core package/SoC; or as a security engine component (chiplet) within a chipset/core package/SoC. Implementation as a security engine may also be performed by a secure endpoint such as DMTF Security Protocol and Data Model (SPDM) component (which may run over any system bus such as PCIe, MCTP, USB, etc.).

The preceding techniques may be implemented in a device that provides an Embedded Security Engine (ESE), which provides a composite device scenario involving a DICE RoT device such as the CSME 10-controller or iGPU, or where there is a TPM. In such examples, at least two architectures may be used: (1) a scenario where ESE is a RoT Attester and where the platform FW (trusted to use the TPM) is a "local verifier"; here, a local verifier would evaluate the ESE Evidence and send a result to a remote Verifier, or, (2) a scenario where ESE is a RoT Attester and the platform FW is another Attester on the platform. The Verifier is remote for both attesters. In these or other architectures, a TPM+RTM+platform FW could implement the local verifier and lead attester roles.

Additionally, the preceding techniques may be implemented by methods such as: assembling Embedded Security Engine Evidence (E1) in a payload message for SPDM, IP, or other protocol; assembling ESE Evidence at the lead Attester (e.g., platform firmware) or by some other TCB layer such as a DICE layer, and creating or adding this claim to the lead Attester's Evidence (E2); delivering both E1 and E2 to a remote Verifier directly; delivering both E1 and E2 to a remote Verifier using a TPM PCR to capture E2 and a digest of E1; maintaining a TCG Event Log to contain both E1 and E2 where the log may reside in the platform for a period of time, or where the log may be requested by a remote Verifier or may be proactively pushed (e.g. every day) to a remote Verifier.

In further method examples, the lead Attester may provide a nonce to the ESE Attester who includes it in E1, or the lead Attester may obtain a nonce from remove Verifier and includes it in E2 and/or E1 (for freshness). Both attesters may include a timestamp claim as an alternative form of freshness. Likewise, the lead Attester as local Verifier may match E1 claims against claims in a reference manifest (e.g. CoSWID/SWID/platform certificate) from an ESE vendor, or may verify E1 claims against a policy that accepts only matched claims In further method examples, a Local Verifier creates an attestation result claim that asserts E1 claims were matched against a manifest and verified against a policy. This may establish provenance of E1, as a manifest and policy was verified by local Verifier (e.g. such as checking a digital signature), or establish the evaluated claims (E1, manifest, policy) as available for peer review/inspection, or as directly included payloads or by reference using a URI to an external service.

Other methods may involve use of a local Attester/Verifier as an Attestation Information Object (AIO), such as where an AIO may create a liveness token (e.g. CWT, JWT, OAuth2) that contains an Attestation Result (AR) that may be shared with one or more relying parties (applications, services, hosts, nodes) that identifies a current attestation status of an ESE.

Figure 20:
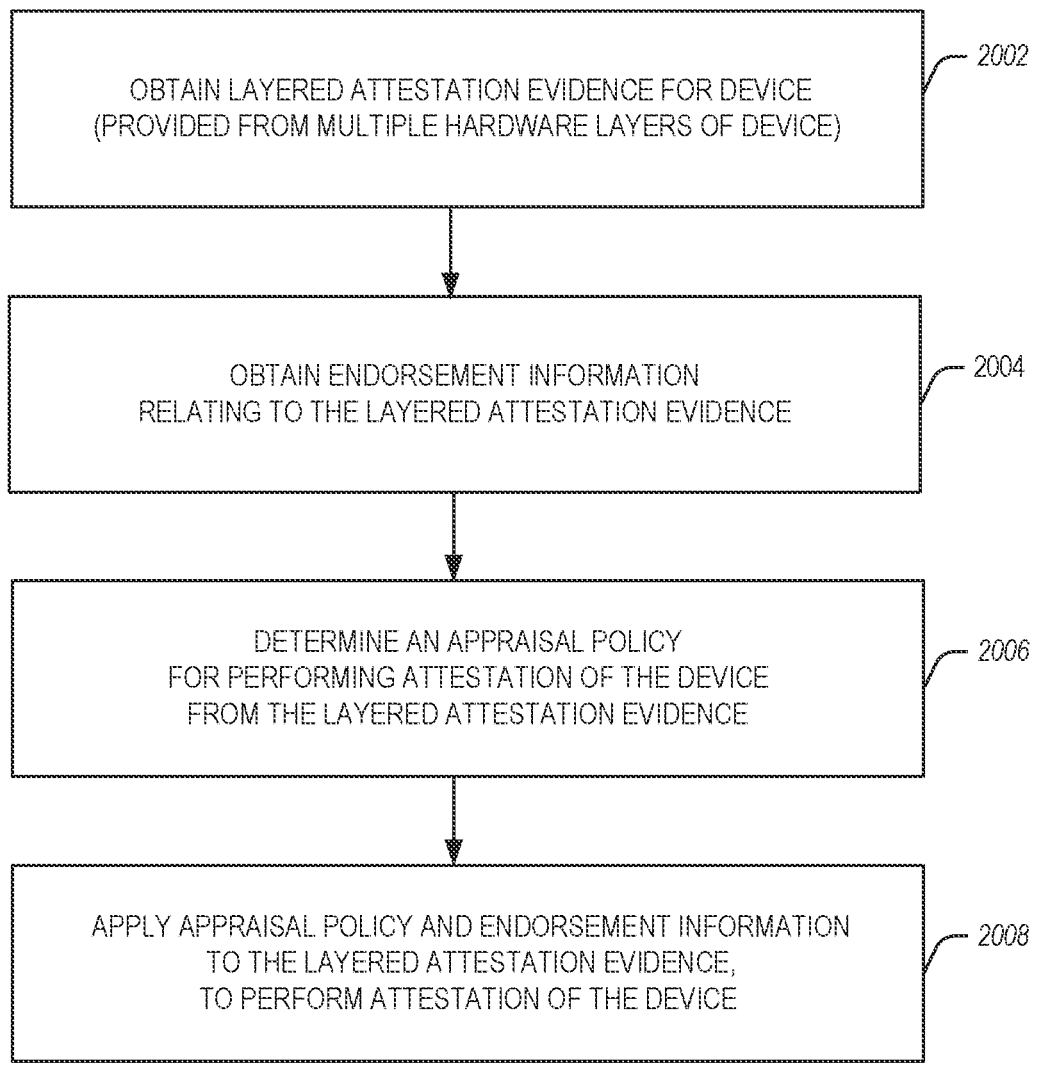
FIG. 20 illustrates a flowchart of a method of performing device attestation, according to various examples.

FIG. 20 illustrates a flowchart of a method of performing device attestation, according to an example. This method may be implemented by: a device, comprising: processing circuitry; and a memory device comprising instructions embodied thereon, wherein the instructions, which when executed by the processing circuitry. This method may be implemented by a non-transitory device-readable storage medium including instructions, wherein the instructions, when executed by a processing circuitry of a device, cause the processing circuitry to perform attestation operations. This method may also be implemented by a plurality of operations executed with a processor and memory of a device, to perform attestation operations comprising. This method may also be implemented by an apparatus comprising respective means to perform the following operations. In a specific example, the device or apparatus is a node operating in an internet of things (IoT) computing system (or IoT network) or in an edge computing network.

Operation 2002 is an operation to obtain layered attestation evidence regarding a state of a device. In an example, the layered attestation evidence includes attesting evidence provided from a second hardware layer of the device, with the attesting evidence provided from the second hardware layer being generated from attesting evidence provided from a first hardware layer of the device to the second hardware layer of the device.

Operation 2004 is an operation to obtain endorsement information relating to the layered attestation evidence for the state of the device. In an example, the attesting evidence provided from the first hardware layer of the device is associated with a hardware component produced by a first entity, and the attesting evidence provided from the second hardware layer of the device is associated with a hardware component produced by a second entity.

Operation 2006 is an operation to determine an appraisal policy for performing attestation of the device from the layered attestation evidence. In an example, layered attestation evidence is provided according to a template, with the template defining properties for applying the appraisal policy to the layered attestation evidence being provided from the first hardware layer and provided from the second hardware layer.

Operation 2008 is an operation to apply the appraisal policy and the endorsement information to the layered attestation evidence, to perform attestation of the device. In an example, the attestation operations are performed by a verifier entity, and the endorsement information is used to identify a plurality of components among multiple hardware layers of the device. For instance, the endorsement information may correspond to properties related to: type, vendor, model, layer, and index.

In further examples, the attestation operations also include verifying that reference values provided in the layered attestation evidence are supplied by an intended owner. For instance, the properties that relate to layered attestation evidence may be provided from at least one of:

firmware, read-only memory, storage memory, fuses, straps, softstraps, or electronic fuses.

Also in further examples, the attesting evidence at each of the first hardware layer and the second hardware layer are produced using one or more certificates associated with trusted computing base properties, with the trusted computing base properties being defined for respective hardware components at the respective layers. Further, the attesting evidence provided from the first hardware layer of the device may be used to attest a trusted computing base to the second hardware layer of the device.

Also in further examples, the endorsement information is provided from a plurality of endorsement manifests, with the endorsement manifests providing information associated with a plurality of entities associated with hardware components providing hardware features at the respective levels, and a plurality of versions associated with the hardware features at the respective levels.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a computing system, comprising: processing circuitry; instructions; and a memory device (e.g., comprising instructions embodied thereon), wherein the instructions, which when executed by the processing circuitry, configure the processing circuitry to perform attestation operations to: obtain layered attestation evidence regarding a state of a compute device, wherein the layered attestation evidence includes attesting evidence provided from a second hardware layer of the compute device, and wherein the attesting evidence provided from the second hardware layer is generated from attesting evidence provided from a first hardware layer of the compute device to the second hardware layer of the compute device; obtain endorsement information relating to the layered attestation evidence for the state of the compute device; determine an appraisal policy for performing attestation of the compute device from the layered attestation evidence; and apply the appraisal policy and the endorsement information to the layered attestation evidence, to perform attestation of the compute device.

In Example 2, the subject matter of Example 1 optionally includes the attesting evidence being provided from the first hardware layer of the compute device is associated with a hardware component produced by a first entity, and wherein the attesting evidence provided from the second hardware layer of the compute device is associated with a hardware component produced by a second entity.

In Example 3, the subject matter of any one or more of Examples 1-2 optionally include the layered attestation evidence being provided according to a template, the template defining properties for applying the appraisal policy to the layered attestation evidence provided from the first hardware layer and provided from the second hardware layer.

In Example 4, the subject matter of Example 3 optionally includes the attestation operations further to: verify that reference values provided in the layered attestation evidence are supplied by an intended owner.

In Example 5, the subject matter of any one or more of Examples 3-4 optionally include properties that relate to layered attestation evidence being related to at least one of: firmware, read-only memory, storage memory, fuses, straps, softstraps, or electronic fuses.

In Example 6, the subject matter of any one or more of Examples 1-5 optionally include the attesting evidence at each of the first hardware layer and the second hardware layer being produced using a certificate associated with trusted computing base properties, the trusted computing base properties being defined for respective hardware components at the respective layers.

In Example 7, the subject matter of any one or more of Examples 1-6 optionally include the attesting evidence provided from the first hardware layer of the compute device attesting a trusted computing base to the second hardware layer of the compute device.

In Example 8, the subject matter of any one or more of Examples 1-7 optionally include the attestation operations being performed by a verifier entity, and wherein the endorsement information is used to identify a plurality of components among multiple hardware layers of the compute device.

In Example 9, the subject matter of Example 8 optionally includes the endorsement information corresponding to properties related to: hardware component type, vendor, model, layer, and index.

In Example 10, the subject matter of any one or more of Examples 1-9 optionally include the endorsement information being provided from a plurality of endorsement manifests, the endorsement manifests providing information associated with a plurality of entities associated with hardware components providing hardware features at the respective levels, and a plurality of versions associated with the hardware features at the respective levels.

In Example 11, the subject matter of any one or more of Examples 1-10 optionally include the compute device being a node operating in an internet of things (IoT) computing system or network, or a node, device, or other computing system operating in an edge computing network.

Example 12 is a non-transitory device-readable storage medium including instructions, wherein the instructions, when executed by a processing circuitry of a computing system, cause the processing circuitry to perform attestation operations to: obtain layered attestation evidence regarding a state of a compute device, wherein the layered attestation evidence includes attesting evidence provided from a second hardware layer of the compute device, and wherein the attesting evidence provided from the second hardware layer is generated from attesting evidence provided from a first hardware layer of the compute device to the second hardware layer of the compute device; obtain endorsement information relating to the layered attestation evidence for the state of the compute device; determine an appraisal policy for performing attestation of the compute device from the layered attestation evidence; and apply the appraisal policy and the endorsement information to the layered attestation evidence, to perform attestation of the compute device.

In Example 13, the subject matter of Example 12 optionally includes the attesting evidence being provided from the first hardware layer of the compute device is associated with a hardware component produced by a first entity, and wherein the attesting evidence provided from the second hardware layer of the compute device is associated with a hardware component produced by a second entity.

In Example 14, the subject matter of any one or more of Examples 12-13 optionally include the layered attestation evidence being provided according to a template, the template defining properties for applying the appraisal policy to the layered attestation evidence provided from the first hardware layer and provided from the second hardware layer.

In Example 15, the subject matter of Example 14 optionally includes the attestation operations further to: verify that reference values provided in the layered attestation evidence are supplied by an intended owner.

In Example 16, the subject matter of any one or more of Examples 14-15 optionally include the properties that relate to layered attestation evidence being related to at least one of: firmware, read-only memory, storage memory, fuses, straps, softstraps, or electronic fuses.

In Example 17, the subject matter of any one or more of Examples 12-16 optionally include the attesting evidence at each of the first hardware layer and the second hardware layer being produced using a certificate associated with trusted computing base properties, the trusted computing base properties being defined for respective hardware components at the respective layers.

In Example 18, the subject matter of any one or more of Examples 12-17 optionally include the attesting evidence provided from the first hardware layer of the compute device attesting a trusted computing base to the second hardware layer of the compute device.

In Example 19, the subject matter of any one or more of Examples 12-18 optionally include the attestation operations being performed by a verifier entity, and wherein the endorsement information is used to identify a plurality of components among multiple hardware layers of the compute device.

In Example 20, the subject matter of Example 19 optionally includes the endorsement information corresponding to properties related to: hardware component type, vendor, model, layer, and index.

In Example 21, the subject matter of any one or more of Examples 12-20 optionally include the endorsement information being provided from a plurality of endorsement manifests, the endorsement manifests providing information associated with a plurality of entities associated with hardware components providing hardware features at the respective levels, and a plurality of versions associated with the hardware features at the respective levels.

In Example 22, the subject matter of any one or more of Examples 12-21 optionally include the compute device being a node operating in an internet of things (IoT) computing system or network, or a node, device, or other computing system operating in an edge computing network.

Example 23 is a method, comprising a plurality of operations executed with a processor and memory of a computing system, to perform attestation operations comprising: obtaining layered attestation evidence regarding a state of a compute device, wherein the layered attestation evidence includes attesting evidence provided from a second hardware layer of the compute device, and wherein the attesting evidence provided from the second hardware layer is generated from attesting evidence provided from a first hardware layer of the compute device to the second hardware layer of the compute device; obtaining endorsement information relating to the layered attestation evidence for the state of the compute device; determining an appraisal policy for performing attestation of the compute device from the layered attestation evidence; and applying the appraisal policy and the endorsement information to the layered attestation evidence, to perform attestation of the compute device.

In Example 24, the subject matter of Example 23 optionally includes the attesting evidence being provided from the first hardware layer of the compute device is associated with a hardware component produced by a first entity, and wherein the attesting evidence provided from the second hardware layer of the compute device is associated with a hardware component produced by a second entity.

In Example 25, the subject matter of any one or more of Examples 23-24 optionally include the layered attestation evidence being provided according to a template, the template defining properties for applying the appraisal policy to the layered attestation evidence provided from the first hardware layer and provided from the second hardware layer.

In Example 26, the subject matter of Example 25 optionally includes the attestation operations further to: verify that reference values provided in the layered attestation evidence are supplied by an intended owner.

In Example 27, the subject matter of any one or more of Examples 25-26 optionally include properties that related to layered attestation evidence being related to at least one of: firmware, read-only memory, storage memory, fuses, straps, softstraps, or electronic fuses.

In Example 28, the subject matter of any one or more of Examples 23-27 optionally include the attesting evidence at each of the first hardware layer and the second hardware layer being produced using a certificate associated with trusted computing base properties, the trusted computing base properties being defined for respective hardware components at the respective layers.

In Example 29, the subject matter of any one or more of Examples 23-28 optionally include the attesting evidence provided from the first hardware layer of the compute device attesting a trusted computing base to the second hardware layer of the compute device.

In Example 30, the subject matter of any one or more of Examples 23-29 optionally include the attestation operations being performed by a verifier entity, and wherein the endorsement information is used to identify a plurality of components among multiple hardware layers of the compute device.

In Example 31, the subject matter of Example 30 optionally includes the endorsement information corresponding to properties related to: hardware component type, vendor, model, layer, and index.

In Example 32, the subject matter of any one or more of Examples 23-31 optionally include the endorsement information being provided from a plurality of endorsement manifests, the endorsement manifests providing information associated with a plurality of entities associated with hardware components providing hardware features at the respective levels, and a plurality of versions associated with the hardware features at the respective levels.

In Example 33, the subject matter of any one or more of Examples 23-32 optionally include the compute device being a node operating in an internet of things (IoT) computing system or network, or a node, device, or other computing system operating in an edge computing network.

Example 34 is an apparatus to perform attestation operations, comprising: means for identifying layered attestation evidence regarding a state of a compute device, wherein the layered attestation evidence includes attesting evidence provided from a second hardware layer of the compute device, and wherein the attesting evidence provided from the second hardware layer is generated from attesting evidence provided from a first hardware layer of the compute device to the second hardware layer of the compute device; means for identifying endorsement information relating to the layered attestation evidence for the state of the compute device;

means for determining an appraisal policy for performing attestation of the compute device from the layered attestation evidence; and means for applying the appraisal policy and the endorsement information to the layered attestation evidence, to perform attestation of the compute device.

In Example 35, the subject matter of Example 34 optionally includes the attesting evidence being provided from the first hardware layer of the compute device that is associated with a hardware component produced by a first entity, and the attesting evidence being provided from the second hardware layer of the compute device that is associated with a hardware component produced by a second entity.

In Example 36, the subject matter of any one or more of Examples 34-35 optionally include the layered attestation evidence being provided according to a template, the template defining properties for applying the appraisal policy to the layered attestation evidence provided from the first hardware layer and provided from the second hardware layer.

In Example 37, the subject matter of Example 36 optionally includes means for verifying that reference values provided in the layered attestation evidence are supplied by an intended owner.

In Example 38, the subject matter of any one or more of Examples 36-37 optionally include properties that relate to layered attestation evidence being related to at least one of: firmware, read-only memory, storage memory, fuses, straps, softstraps, or electronic fuses.

In Example 39, the subject matter of any one or more of Examples 34-38 optionally include the attesting evidence at each of the first hardware layer and the second hardware layer being produced using a certificate associated with trusted computing base properties, the trusted computing base properties being defined for respective hardware components at the respective layers.

In Example 40, the subject matter of any one or more of Examples 34-39 optionally include the attesting evidence provided from the first hardware layer of the compute device attesting a trusted computing base to the second hardware layer of the compute device.

In Example 41, the subject matter of any one or more of Examples 34-40 optionally include the attestation operations being performed by a verifier entity, and wherein the endorsement information is used to identify a plurality of components among multiple hardware layers of the compute device.

In Example 42, the subject matter of Example 41 optionally includes the endorsement information corresponding to properties related to: hardware component type, vendor, model, layer, and index.

In Example 43, the subject matter of any one or more of Examples 34-42 optionally include the endorsement information being provided from a plurality of endorsement manifests, the endorsement manifests providing information associated with a plurality of entities associated with hardware components providing hardware features at the respective levels, and a plurality of versions associated with the hardware features at the respective levels.

In Example 44, the subject matter of any one or more of Examples 34-43 optionally include the apparatus being a node operating in an internet of things (IoT) computing system or network, or a node, device, or other computing system operating in an edge computing network.

In Example 45, the subject matter of any one of more of Examples 1-44 may be implemented by an apparatus comprising: at least one memory; and processor circuitry including one or more of: (i) at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first attestation operations corresponding to instructions, and one or more registers to store a result of the one or more first attestation operations, using the instructions; (ii) a Field Programmable Gate Array (FPGA), the FPGA including logic gate circuitry, a plurality of configurable interconnections, and storage circuitry, the logic gate circuitry and interconnections to perform one or more second attestation operations, and the storage circuitry to store a result of the one or more second attestation operations; or (iii) Application Specific Integrated Circuitry including logic gate circuitry to perform one or more third attestation operations; and combinations or variations thereof.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

What is claimed is:
1. A computing system, comprising:
at least one memory to store instructions; and
processing circuitry to execute the instructions to perform operations that verify a state of a hardware device capable to perform compute operations on behalf of the computing system, the instructions to perform operations to:
- obtain layered attestation evidence from the hardware device regarding the state of the hardware device, wherein the layered attestation evidence includes attesting evidence from a first hardware layer of the hardware device that is dependent on attesting evidence from a second hardware layer of the hardware device;
- obtain endorsement information to be used to evaluate the layered attestation evidence, the endorsement information obtained from a manifest and relating to a third party verification of the state of the hardware device;
- determine an appraisal policy to be used to evaluate the layered attestation evidence, the appraisal policy obtained from an expected device definition;
- validate attestation of the state of the hardware device by applying the appraisal policy and the endorsement information to evaluate the layered attestation evidence; and
- perform compute operations with the hardware device, in response to the attestation of the state of the hardware device.

2. The computing system of claim 1, wherein the attesting evidence provided from the first hardware layer of the hardware device is associated with a hardware component produced by a first entity, and wherein the attesting evidence provided from the second hardware layer of the hardware device is associated with a hardware component produced by a second entity.

3. The computing system of claim 1, wherein the layered attestation evidence is provided according to a template, the template defining properties for applying the appraisal policy to the layered attestation evidence provided from the first hardware layer and provided from the second hardware layer.

4. The computing system of claim 3, wherein to validate the attestation of the state of the hardware device includes operations to:
- verify that reference values provided in the layered attestation evidence are supplied by an intended owner.

5. The computing system of claim 3, wherein the properties relate to layered attestation evidence from at least one of: firmware, read-only memory, storage memory, fuses, straps, softstraps, or electronic fuses.

6. The computing system of claim 1, wherein the attesting evidence at each of the first hardware layer and the second hardware layer is produced using a certificate associated with trusted computing base properties, the trusted computing base properties being defined for respective hardware components at the respective layers.

7. The computing system of claim 1, wherein the attesting evidence provided from the first hardware layer of the hardware device attests a trusted computing base to the second hardware layer of the hardware device.

8. The computing system of claim 1, wherein to validate the attestation of the state of the hardware device includes operations performed by a verifier entity, and wherein the endorsement information is used to identify a plurality of components among multiple hardware layers of the hardware device.

9. The computing system of claim 8, wherein the endorsement information corresponds to properties related to: hardware component type, vendor, model, layer, and index.

10. The computing system of claim 1, wherein the endorsement information is provided from a plurality of endorsement manifests, the plurality of endorsement manifests providing information associated with a plurality of entities associated with hardware components providing hardware features at the respective layers, and a plurality of versions associated with the hardware features at the respective layers.

11. The computing system of claim 1, wherein the hardware device is a node operating in: an internet of things (IoT) computing system or an edge computing network.

12. A non-transitory machine-readable storage medium including instructions, wherein the instructions, when executed by a processing circuitry of a computing system, cause the processing circuitry to perform attestation operations to:
- obtain layered attestation evidence regarding a state of a hardware device capable to perform compute operations on behalf of the computing system, wherein the layered attestation evidence includes attesting evidence from a first hardware layer of the hardware device that is dependent on attesting evidence from a second hardware layer of the hardware device;
- obtain endorsement information to be used to evaluate the layered attestation evidence, the endorsement information obtained from a manifest and relating to a third party verification of the state of the hardware device;
- determine an appraisal policy to be used to evaluate the layered attestation evidence, the appraisal policy obtained from an expected device definition;
- validate attestation of the state of the hardware device by applying the appraisal policy and the endorsement information to evaluate the layered attestation evidence; and
- perform compute operations with the hardware device, in response to the attestation of the state of the hardware device.

13. The machine-readable storage medium of claim 12, wherein the attesting evidence provided from the first hardware layer of the hardware device is associated with a hardware component produced by a first entity, and wherein the attesting evidence provided from the second hardware layer of the hardware device is associated with a hardware component produced by a second entity.

14. The machine-readable storage medium of claim 12, wherein the layered attestation evidence is provided according to a template, the template defining properties for applying the appraisal policy to the layered attestation evidence provided from the first hardware layer and provided from the second hardware layer.

15. The machine-readable storage medium of claim 14, the attestation operations further to:
- verify that reference values provided in the layered attestation evidence are supplied by an intended owner.

16. The machine-readable storage medium of claim 14, wherein the properties relate to layered attestation evidence from at least one of: firmware, read-only memory, storage memory, fuses, straps, softstraps, or electronic fuses.

17. The machine-readable storage medium of claim 12, wherein the attesting evidence at each of the first hardware layer and the second hardware layer is produced using a certificate associated with trusted computing base properties, the trusted computing base properties being defined for respective hardware components at the respective layers.

18. The machine-readable storage medium of claim 12, wherein the attesting evidence provided from the first hardware layer of the hardware device attests a trusted computing base to the second hardware layer of the hardware device.

19. The machine-readable storage medium of claim 12, wherein the attestation operations are performed by a verifier entity, and wherein the endorsement information is used to identify a plurality of components among multiple hardware layers of the hardware device.

20. The machine-readable storage medium of claim 19, wherein the endorsement information corresponds to properties related to: hardware component type, vendor, model, layer, and index.

21. The machine-readable storage medium of claim 12, wherein the endorsement information is provided from a plurality of endorsement manifests, the plurality of endorsement manifests providing information associated with a plurality of entities associated with hardware components providing hardware features at the respective layers, and a plurality of versions associated with the hardware features at the respective layers.

22. The machine-readable storage medium of claim 12, wherein the hardware device is a node operating in:
an internet of things (IoT) computing system or an edge computing network.

23. A method, comprising a plurality of operations executed with a processor and memory of a computing system, to perform attestation operations comprising:
obtaining layered attestation evidence regarding a state of a hardware device capable to perform compute operations on behalf of the computing system, wherein the layered attestation evidence includes attesting evidence from a first hardware layer of the hardware device that is dependent on attesting evidence from a second hardware layer of the hardware device;
obtaining endorsement information to be used to evaluate the layered attestation evidence, the endorsement information obtained from a manifest and relating to a third party verification of the state of the hardware device;
determining an appraisal policy to be used to evaluate the layered attestation evidence, the appraisal policy obtained from an expected device definition;
validating attestation of the state of the hardware device by applying the appraisal policy and the endorsement information to evaluate the layered attestation evidence; and
performing compute operations with the hardware device, in response to the attestation of the state of the hardware device.

24. The method of claim 23, wherein the attesting evidence provided from the first hardware layer of the hardware device is associated with a hardware component produced by a first entity, and wherein the attesting evidence provided from the second hardware layer of the hardware device is associated with a hardware component produced by a second entity.

25. The method of claim 23, wherein the layered attestation evidence is provided according to a template, the template defining properties for applying the appraisal policy to the layered attestation evidence provided from the first hardware layer and provided from the second hardware layer, and wherein the properties relate to layered attestation evidence from at least one of: firmware, read-only memory, storage memory, fuses, straps, softstraps, or electronic fuses.

26. An apparatus to perform attestation operations, comprising:
means for identifying layered attestation evidence regarding a state of a hardware device capable to perform compute operations on behalf of the apparatus, wherein the layered attestation evidence includes attesting evidence from a first hardware layer of the hardware device that is dependent on attesting evidence from a second hardware layer of the hardware device;
means for identifying endorsement information to be used to evaluate the layered attestation evidence, the endorsement information obtained from a manifest and relating to a third party verification of the state of the hardware device;
means for determining an appraisal policy to be used to evaluate the layered attestation evidence, the appraisal policy obtained from an expected device definition;
means for validating attestation of the state of the hardware device by applying the appraisal policy and the endorsement information to evaluate the layered attestation evidence; and
means for causing compute operations to be performed with the hardware device, in response to the attestation of the state of the hardware device.

27. The apparatus of claim 26, further comprising:
means for verifying that reference values provided in the layered attestation evidence are supplied by an intended owner.

28. The apparatus of claim 26, wherein the attesting evidence provided from the first hardware layer of the hardware device provides attestation of a trusted computing means to the second hardware layer of the hardware device.

* * * * *